United States Patent
Nishikubo et al.

(10) Patent No.: US 11,897,381 B2
(45) Date of Patent: Feb. 13, 2024

(54) WORKING VEHICLE

(71) Applicant: KUBOTA CORPORATION, Osaka (JP)

(72) Inventors: Takuya Nishikubo, Sakai (JP); Hiroshi Miyake, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 406 days.

(21) Appl. No.: 17/465,903

(22) Filed: Sep. 3, 2021

(65) Prior Publication Data

US 2021/0394836 A1 Dec. 23, 2021

Related U.S. Application Data

(63) Continuation of application No. PCT/JP2020/004301, filed on Feb. 5, 2020.

(30) Foreign Application Priority Data

Mar. 6, 2019 (JP) .................................. 2019-040826

(51) Int. Cl.
| | |
|---|---|
| *G01S 15/931* | (2020.01) |
| *B60Q 1/04* | (2006.01) |
| *B60Q 1/00* | (2006.01) |
| *B62D 49/06* | (2006.01) |
| *B60Q 1/24* | (2006.01) |

(52) U.S. Cl.
CPC ......... *B60Q 1/0483* (2013.01); *B60Q 1/0035* (2013.01); *B60Q 1/245* (2013.01); *B60Q 1/247* (2022.05); *B62D 49/0614* (2013.01); *G01S 15/931* (2013.01); *G01S 2015/937* (2013.01)

(58) Field of Classification Search
CPC ............................ B60Q 1/0483; G01S 15/931
USPC .......................................................... 33/264
See application file for complete search history.

(56) References Cited

U.S. PATENT DOCUMENTS

| | | | | |
|---|---|---|---|---|
| 4,967,860 A | * | 11/1990 | Kremser | G01S 15/87 367/909 |
| 4,968,878 A | * | 11/1990 | Pong | A47L 11/4061 250/221 |

(Continued)

FOREIGN PATENT DOCUMENTS

| | | |
|---|---|---|
| EP | 2 581 266 A2 | 4/2013 |
| EP | 3 127 787 A1 | 2/2017 |

(Continued)

OTHER PUBLICATIONS

Official Communication issued in European Patent Application No. 20766216.4, dated Oct. 28, 2022.

(Continued)

*Primary Examiner* — George B Bennett
(74) *Attorney, Agent, or Firm* — Keating & Bennett, LLP

(57) ABSTRACT

A working vehicle includes a vehicle body, an obstacle detector to detect an obstacle in a vicinity of the vehicle body, at least one lamp to be lighted on a peripheral portion of the vehicle body, and an attachment bracket attached to the vehicle body. The attachment bracket includes an attachment body including a detector-attaching portion to which the obstacle detector is attached, and at least one lamp-attaching portion to which the at least one lamp is attached.

20 Claims, 20 Drawing Sheets

(56) References Cited

U.S. PATENT DOCUMENTS

| | | | | |
|---|---|---|---|---|
| 6,474,489 | B2 * | 11/2002 | Payne | B61F 19/06 105/393 |
| 7,719,410 | B2 * | 5/2010 | Labuhn | B60W 30/08 340/435 |
| 7,949,469 | B2 * | 5/2011 | Hattori | G08G 1/166 701/1 |
| 9,574,387 | B2 * | 2/2017 | Jankovsky | E06B 9/68 |
| 10,583,832 | B2 * | 3/2020 | Foster | A01B 69/001 |
| 11,021,103 | B2 * | 6/2021 | Haar | B60K 35/00 |
| 11,630,201 | B2 * | 4/2023 | Koga | G01S 13/867 701/25 |
| 2004/0183661 | A1 * | 9/2004 | Bowman | G08G 1/165 342/70 |
| 2015/0302591 | A1 * | 10/2015 | Kim | G06T 7/536 382/103 |
| 2019/0384321 | A1 | 12/2019 | Nishi et al. | |
| 2021/0055415 | A1 * | 2/2021 | Koenig | G01S 7/527 |
| 2021/0404553 | A1 * | 12/2021 | Endo | F16H 61/439 |
| 2022/0144609 | A1 * | 5/2022 | Yamamoto | G05D 1/0212 |
| 2022/0266841 | A1 * | 8/2022 | Shintani | G05D 1/024 |
| 2022/0276656 | A1 * | 9/2022 | Nishikubo | G05D 1/0214 |
| 2023/0264938 | A1 * | 8/2023 | Ishizaki | B66F 9/0755 701/50 |
| 2023/0320247 | A1 * | 10/2023 | Kinoshita | G05D 1/02 701/23 |

FOREIGN PATENT DOCUMENTS

| | | |
|---|---|---|
| EP | 3 238 993 A1 | 11/2017 |
| EP | 3 246 474 A1 | 11/2017 |
| EP | 3 650 605 A1 | 5/2020 |
| JP | 59-43002 U | 3/1984 |
| JP | 60-20441 U | 2/1985 |
| JP | 08-183386 A | 7/1996 |
| JP | 2008-2906897 A | 12/2008 |
| JP | 2016-084053 A | 5/2016 |
| JP | 2018-114927 A | 7/2018 |

OTHER PUBLICATIONS

Official Communication issued in International Patent Application No. PCT/JP2020/004301, dated Apr. 14, 2020.

* cited by examiner

WORKING VEHICLE

CROSS REFERENCE TO RELATED APPLICATIONS

This application is a continuation application of International Application No. PCT/JP2020/004301, filed on Feb. 5, 2020, which claims the benefit of priority to Japanese Patent Application No. 2019-040826, filed on Mar. 6, 2019. The entire contents of each of these applications are hereby incorporated herein by reference.

BACKGROUND OF THE INVENTION

1. Field of the Invention

The present invention relates to a working vehicle.

2. Description of the Related Art

A working vehicle disclosed in Japanese Unexamined Patent Application Publication No. 2018-114927 is already known.

The working vehicle disclosed in Japanese Unexamined Patent Application Publication No. 2018-114927 is provided with a detector configured to detect an obstacle around a vehicle body, a combination lamp including combination of a plurality of lamps, and work lamps configured to illuminate an area around the vehicle body.

SUMMARY OF THE INVENTION

In the working vehicle disclosed in Japanese Unexamined Patent Application Publication No. 2018-114927, the detector for detecting an obstacle and the lamps (that is, the combination lamp and the work lamps) are installed separately, which makes installation troublesome, increases the number of parts, and thus increases costs.

Preferred embodiments of the present invention provide working vehicles each of which allows a detector (an obstacle detector) to detect an obstacle and lamps to be easily installed and reduces the costs.

A working vehicle according to an aspect of a preferred embodiment of the present invention includes a vehicle body, an obstacle detector to detect an obstacle in a vicinity of the vehicle body, at least one lamp to be lighted on a peripheral portion of the vehicle body, and an attachment bracket attached to the vehicle body. The attachment bracket includes an attachment body including a detector-attaching portion to which the obstacle detector is attached, and at least one lamp-attaching portion to which the at least one lamp is attached.

The working vehicle includes a cabin mounted on the vehicle body, an entrance step provided under the cabin, and a front pillar provided above the entrance step and at a front portion of the cabin. The attachment bracket is attached to the front pillar.

The working vehicle includes a front wheel provided on a front portion of the vehicle body, and a rear wheel provided on a rear portion of the vehicle body. The obstacle detector is configured to detect an obstacle outward in a vehicle-width direction from the vehicle body and between the front wheel and the rear wheel.

The at least one lamp includes a combination lamp including a plurality of lamps combined with each other, and a work lamp to illuminate the vicinity of the vehicle body, and the at least one lamp-attaching portion includes a first lamp-attaching portion to which the combination lamp is attached, and a second lamp-attaching portion to which the work lamp is attached.

The detector-attaching portion is provided at a vehicle-width directional outward portion of the attachment body so as to enable the obstacle detector attached to the detector-attaching portion to detect an obstacle outward in the vehicle-width direction from the vehicle body. The first lamp-attaching portion is provided at a front portion of the attachment body. The work lamp includes a headlamp to illuminate forward from the vehicle body, and a sidelamp to illuminate outward in the vehicle-width direction from the vehicle body. The second lamp-attaching portion includes an upper attaching portion, to which one of the headlamp and the sidelamp is attached, provided at an upper portion of the attachment body, and a lower attaching portion, to which the other of the headlamp and the sidelamp is attached, provided at a lower portion of the attachment body.

The attachment bracket includes a bracket base attached to the front pillar, and a bracket arm extending forward from the bracket base and supporting the attachment body. The attachment body includes a bracket assembly fixed to the bracket arm. The bracket assembly includes a rear wall portion, a top wall portion extending forward from an upper end of the rear wall portion, a bottom wall portion extending forward from a lower end of the rear wall portion, an upper front wall portion extending downward from a front end of the top wall portion, and a lower front wall portion extending upward from a front end of the bottom wall portion. The first lamp-attaching portion includes the upper front wall portion and the lower front wall portion. The upper attaching portion includes the top wall portion. The lower attaching portion includes the bottom wall portion.

The obstacle detector includes a sonar including a transmitter. The sonar is configured to detect an obstacle by a sonic wave transmitted from the transmitter. The bracket assembly includes an attachment plate protruding forward from a vertically intermediate portion of the rear wall portion. The detector-attaching portion includes an attachment base attached to the attachment plate, a sloped wall extending upwardly outward in the vehicle-width direction from the attachment base, and a detector stay, to which the obstacle detector is attached, fixed on an upper surface of the sloped wall. The sloped wall includes a transmitter opening in which the transmitter is provided.

The bracket assembly includes a connection wall portion connecting the rear wall portion to the lower front wall portion. The bracket arm is provided inward in the vehicle-width direction from the bracket assembly and is fixed to the connection wall portion. The attachment body includes a cover including a back wall attached to a back surface of the rear wall portion, a first side wall extending forward from a vehicle-width directional outer end of the back wall, and a second side wall extending forward from a vehicle-width directional inner end of the back wall. The first side wall includes a first notch being open forward so that the detector-attaching portion having the obstacle detector attached thereto can be inserted rearward into the first notch. The second side wall includes a second notch being open forward so that the bracket arm can be inserted rearward into the second notch.

The plurality of lamps included in the combination lamp include a position lamp to inform people around the working vehicle of a vehicle width, and a turn-signal lamp to indicate a turn-direction of the vehicle body when turning.

Due to the above-mentioned configuration in which the attachment body includes the detector-attaching portion and the lamp-attaching portion, the obstacle detector and the lamps can be collectively attached to the single attachment body, thus making attachment of these devices easier and reducing costs for the attachment.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
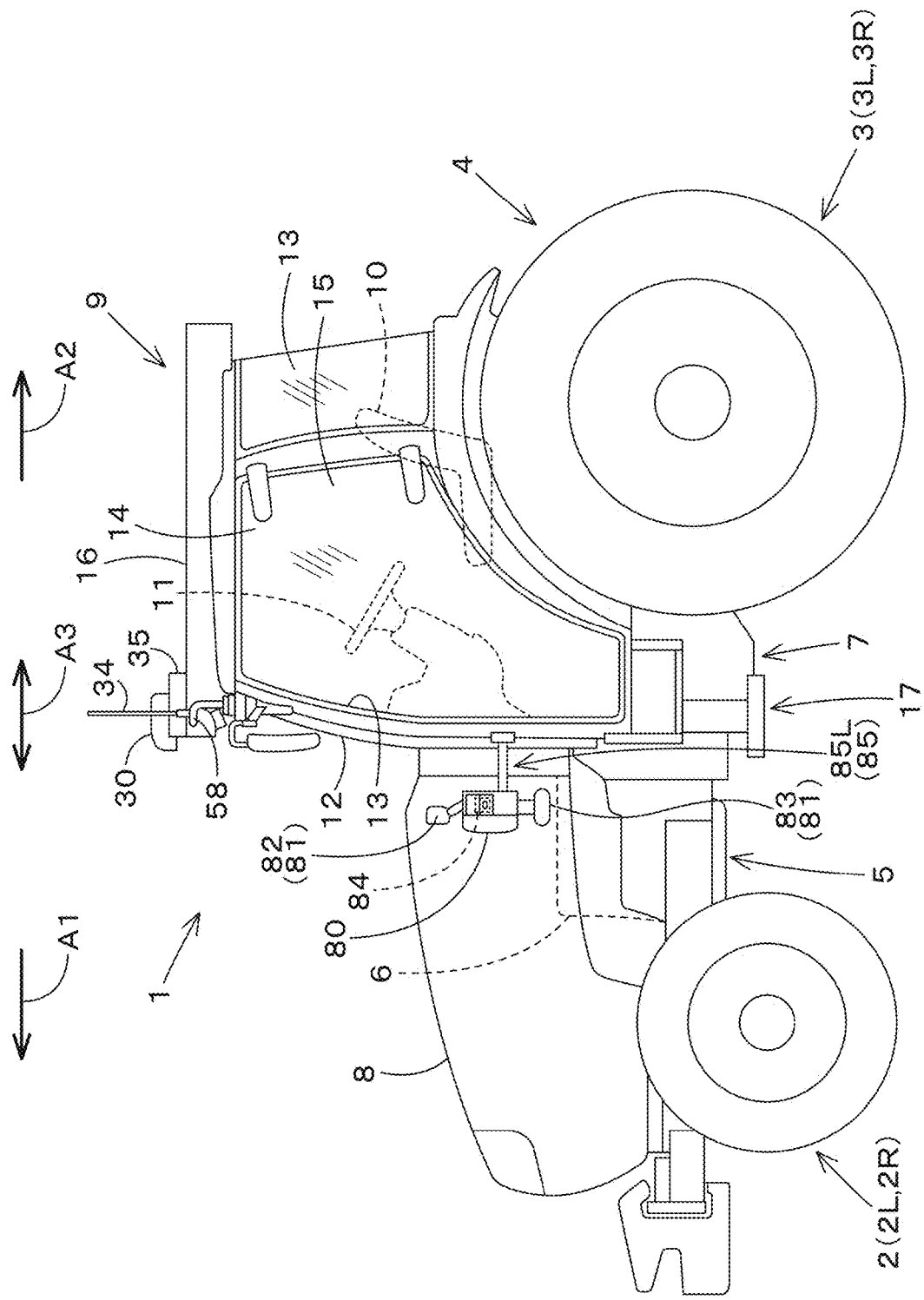
FIG. 1 is a side view of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

Figure 2:
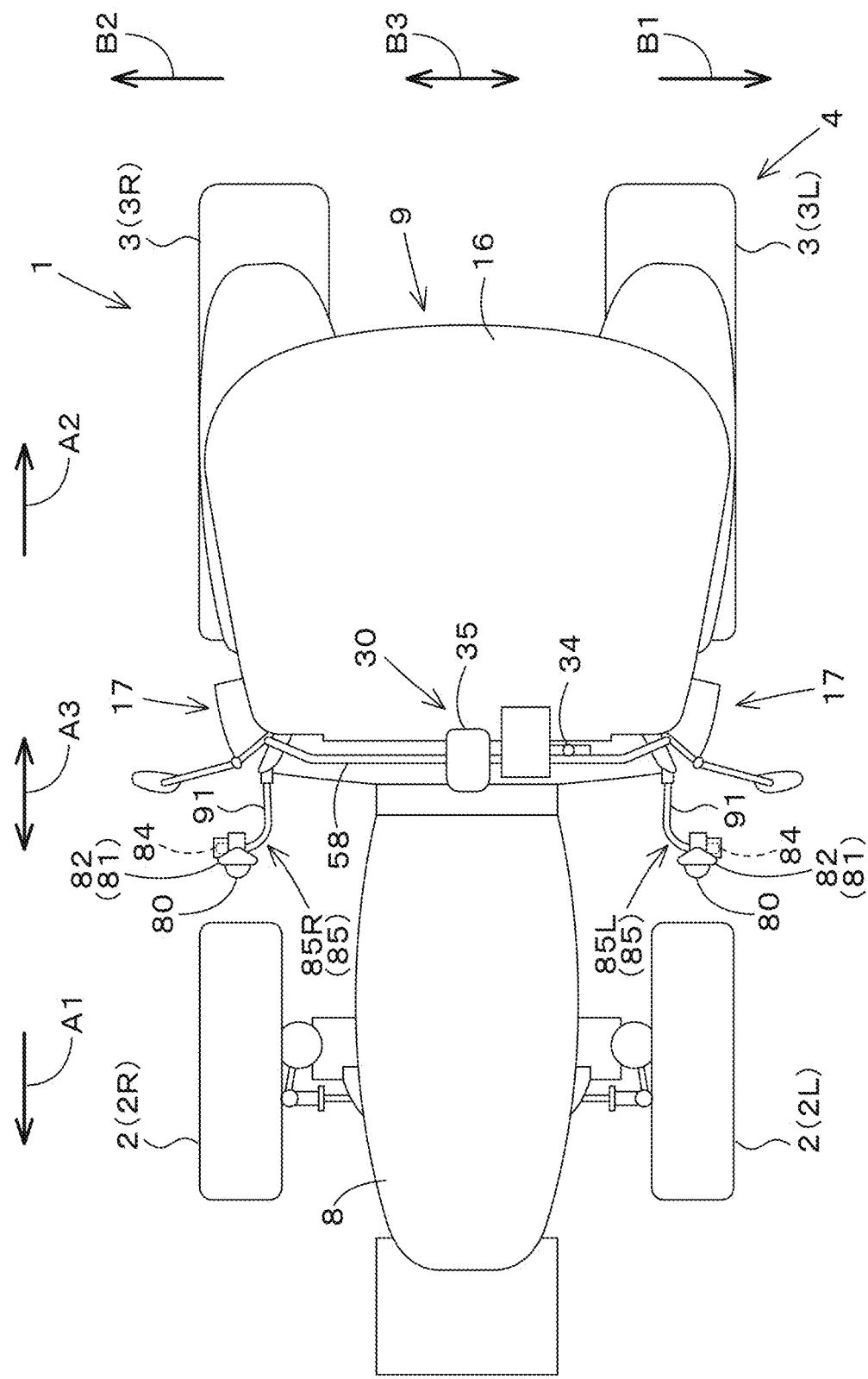
FIG. 2 is a plan view of the working vehicle.

FIG. 1 is a schematic side view showing an overall configuration of a working vehicle 1 according to the present preferred embodiment. FIG. 2 is a schematic plan view of the working vehicle 1. In the present preferred embodiment, a tractor is exemplified as the working vehicle 1.

In explanations of the present preferred embodiment, a direction of an arrowed line A1 in FIGS. 1 and 2 (that is, a forward traveling direction of the tractor 1) is referred to as the front, a direction of an arrowed line A2 in FIGS. 1 and 2 (that is, a reverse traveling direction of the tractor 1) is referred to as the rear, a direction of an arrowed line A3 in FIGS. 1 and 2 is referred to as a fore-and-aft direction. Accordingly, a front surface side of FIG. 1 is referred to as the left (that is, a direction of an arrowed line B1 in FIG. 2), and a back surface side of FIG. 1 is referred to as the right (that is, a direction of an arrowed line B2 in FIG. 2). A horizontal direction perpendicular to the fore-and-aft direction A3 is referred to as a vehicle-width direction (that is, a direction of arrowed line B3 in FIG. 2) that is a width direction of the tractor 1 (the working vehicle). Directions from the center of the tractor 1 to the left and to the right in the vehicle-width direction B3 are referred to as a vehicle outward direction. In other words, the vehicle outward direction is a direction diverging away from the center of the tractor 1 in the width direction, that is, the vehicle-width direction B3. In the explanation, a direction opposite to the vehicle outward direction is referred to as a vehicle inward direction. In other words, the vehicle inward direction is a direction approaching the center of the tractor 1 in the width direction, that is, the vehicle-width direction B3.

As shown in FIGS. 1 and 2, the tractor 1 has a vehicle body 5. The vehicle body 5 is provided with a prime mover 6 and a transmission case 7. The prime mover 6 is a diesel engine. The prime mover 6 may be a gasoline engine or an electric motor, or may be a hybrid type having an engine and an electric motor. The prime mover 6 is disposed at a front portion of the tractor 1 and is covered by a hood 8.

For example, the transmission case 7 includes a flywheel housing, a clutch housing and a speed-shift transmission housing directly joined to one another. The flywheel housing incorporates a flywheel. The clutch housing incorporates a clutch to transmit and interrupt power of the prime mover 6 from the flywheel. The speed-shift transmission housing incorporates a speed-shift transmission device to speed-shift the power from the clutch.

As shown in FIGS. 1 and 2, the vehicle body 5 is movably supported by a traveling device, e.g., a wheeled traveling device 4 including a plurality of wheels 2 and 3, and is thus configured to travel. The plurality of wheels 2 and 3 include the front wheels 2 (2L and 2R) provided on the left and right sides of the front portion of the vehicle body 5, and include the rear wheels (3L and 3R) provided on the left and right sides of the rear portion of the vehicle body 5.

As shown in FIG. 1, the tractor 1 has a cabin 9 mounted on a rear portion of the vehicle body 5. In a rear portion of an interior of the cabin 9, a driver seat 10 on which an operator is seated is provided. In front of the driver seat 10, a steering wheel 11 to steer the front wheels 2 (2L and 2R) is provided. A front windshield 12 is provided on a front surface of the cabin 9. A rear windshield is provided in the rear portion of the cabin 9. The cabin 9 is provided at side surfaces (that is, a left side surface and a right side surface) thereof with an entrance 13 through which the operator gets in and out of the cabin 9, and an entrance door 14 for opening and closing the entrance 13. A rear side windshield 15 is provided behind the entrance door 14. The cabin 9 is provided at an upper portion thereof with a roof 16 forming a ceiling. An entrance step 17 on which the operator puts his/her foot when getting in and out of the cabin 9 is provided below the cabin 9. The entrance step 17 is provided below each of the left and right entrance doors 14.

Figure 3:
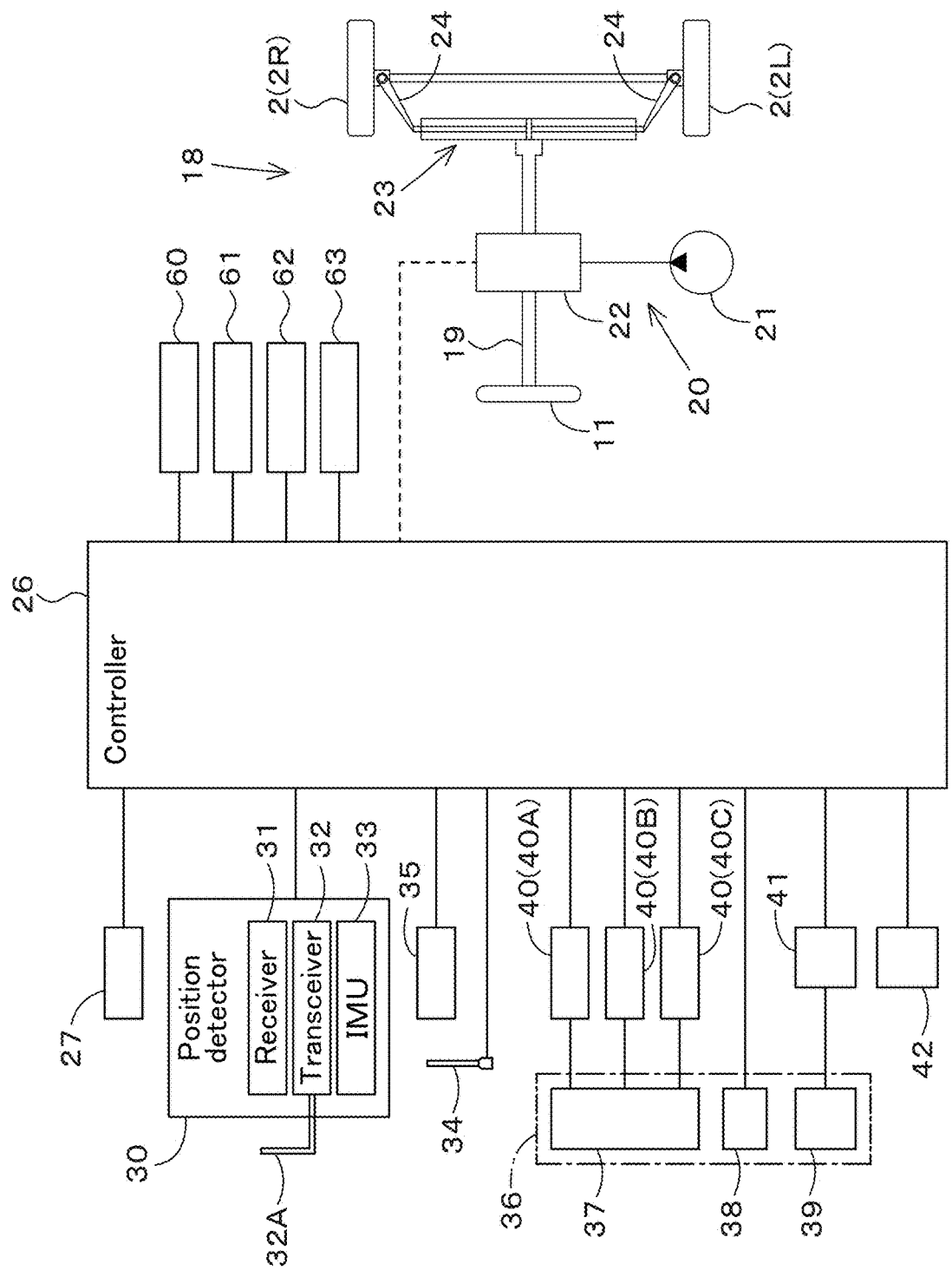
FIG. 3 is a configuration view showing a partial configuration of the working vehicle and a control block diagram.

Referring to FIG. 3, schematic configurations of a traveling system and a control system of the tractor 1 will be described below.

As shown in FIG. 3, the tractor 1 is provided with a steering device 18. The steering device 18 is adaptable for both manual steering and automatic steering. The manual steering includes steering of the vehicle body 5 through operation by an operator, and the automatic steering includes automatic steering of the vehicle body 5 without operation by the operator. The steering device 18 has the steering wheel 11 and a rotating shaft (that is, a steering shaft) 19 that rotates with rotation of the steering wheel 11. The steering device 18 includes an auxiliary mechanism (that is, a power steering mechanism) 20 that assists the operation of the steering wheel 11. In detail, the auxiliary mechanism 20 includes a hydraulic pump 21, a control valve 22 supplied with fluid from the hydraulic pump 21, and a steering cylinder 23 controlled by the control valve 22. The control valve 22 is, for example, a three-position switching valve shiftable by moving a spool or the like in response to a steering direction (that is, a rotational direction) of the rotating shaft 19. In addition, the control valve 22 is a solenoid valve operable based on a control signal. The steering cylinder 23 connects arms (specifically, knuckle arms) 24 for changing respective directions of the front wheels 2 to each other.

When an operator grips the steering wheel 11 and operates it in one direction or the other, a shift position and an opening degree of the control valve 22 are changed in correspondence to a rotational direction of the steering wheel 11, and a piston rod of the steering cylinder 23 moves to the left or to the right according to the shift position and the opening degree of the control valve 22, thus changing turning directions (that is, steering directions) of the front wheels 2. Therefore, the vehicle body 5 can change its traveling direction to the left or to the right through manual steering of the steering wheel 11. The configuration of the steering device 18 is not limited to that as described above that is only an example.

As shown in FIG. 3, the tractor 1 is provided with a controller 26. The controller 26 is provided with a microprocessor including a CPU (that is, a Central Processing Unit), an EEPROM (that is, an Electrically Erasable Programmable Read-Only Memory), and/or the like.

The controller 26 is configured or programmed to control various functions of the tractor 1. The controller 26 is connected to a state detector 27 configured to detect a driving state and the like of the tractor 1. The state detector 27 is a device to detect statuses of a traveling system, for example, and it is configured to detect respective detected statuses of a crank sensor, a cam sensor, an engine rotation sensor, an acceleration sensor, a vehicle-speed sensor, a steering-angle sensor, and a later-discussed position detector, for example. In addition to the statuses of the traveling system, the status detector 27 may include a lifting-lever detection sensor, a PTO-rotation detection sensor, and/or the like. The controller 26 controls the traveling system and a working system in the tractor 1. For example, the controller 26 controls a rotating speed of the prime mover 6 (that is, an engine), a vehicle speed, and a steering angle of the steering device 18, based on the statuses detected by the status detector 27. In addition, the status detector 27 controls, based on the detected state detected by the status detector 27, lifting of a lifting device to lift a working device to be attached to the tractor 1 (for example, a ground working device such as a cultivator), a PTO rotating speed, and the like.

The controller 26 is operably connected to the speed-shift transmission device 60, a forward/reverse switching device 61, a PTO clutch 62, and a braking device 63. The controller 26 is connected to the speed-shift transmission device 60, the forward/reverse switching device 61, the PTO clutch 62, and the braking device 63 via an in-vehicle LAN or a communication line such as the CAN (Controller Area Network). The controller 26 is configured or programmed to control actions of the speed-shift transmission device 60, the forward/reverse switching device 61, the PTO clutch 62, and the braking device 63.

The controller 26 is operably connected to a position detector 30 configured to detect a position of the vehicle body 5 (that is, the tractor 1). The controller 26 is configured or programmed to acquire the position detected by the position detector 30. The position detector 30 is configured to detect its own position (that is, positioning information including latitude and longitude) from a satellite positioning system (including a positioning satellite). That is, the position detector 30 receives signals referred to as received signals (including a positions of the positioning satellite, a signal-transmission time, correction information, and the like) transmitted from the positioning satellite, and detects the position (e.g., latitude/longitude position) based on the received signal.

The position detector 30 uses the well-known GPS (Global Positioning System), which is an example of the Global Navigation Satellite System (GNSS), to obtain position and direction of the vehicle body 5. In the present preferred embodiment, the RTK-GPS, which is suitable for positioning of moving objects, is used.

As shown in FIG. 3, the position detector 30 has a receiver 31, a wireless transceiver 32, and an Inertial Measurement Unit (IMU) 33.

The receiver 31 has an antenna or the like to receive the received signal transmitted from the positioning satellite.

The wireless transceiver 32 has an antenna 32A and communicates with a base station (reference station) installed at a known location. The base station transmits, to the position detector 30, positioning data (that is, correction information) obtained by receiving radio waves from the positioning satellite. The position detector 30 receives the radio waves (that is, signals) transmitted from the positioning satellite and the positioning data (that is, signals) transmitted from the base station, and detects its own position (that is, the latitude/longitude position) based on the positioning data obtained by receiving the radio waves from the positioning satellite and the positioning data from the base station.

The inertial measurement unit 33 includes an acceleration sensor to detect acceleration, a gyro sensor to detect angular velocity, and the like. The inertial measurement unit 33 is capable of detecting a roll angle, a pitch angle, a yaw angle, and the like of the vehicle body 5.

The controller 26 is configured or programmed to perform automatic traveling (or automatic traveling control) of the tractor 1 (that is, the vehicle body 5). The controller 26 is configured or programmed to selectively set a traveling mode shiftable between an automatic traveling mode and a manual traveling mode.

In the automatic traveling mode, the controller 26 determines a shift position and an opening degree of the control valve 22 so that at least a traveling position of the vehicle body (that is, a position detected by the position detector 30) matches a scheduled traveling route (that is, a traveling path) that is preliminarily determined. In detail, in the automatic traveling mode, the controller 26 compares a traveling position of the vehicle body 5 with a position indicated as that on the traveling route (that is, a scheduled traveling position), and when the traveling position matches the scheduled traveling position, the turning angle and the direction of the steering wheel 11 in the steering device 18 (that is, steering angles and steering directions of the front wheels 2) are kept unchanged (that is, an opening degree and/or a switching position of the control valve 22 are kept unchanged). On the other hand, when the traveling position fails to match the scheduled traveling position, the controller 26 changes the steering angle and/or the steering direction of the steering wheel 11 in the steering device 18 (that is, changes an opening degree and/or a switching position of the control valve 22) so that a deviation (deviation amount) of the traveling position from the scheduled traveling position becomes zero.

In the above-described preferred embodiment, the controller 26 changes the steering angle of the steering device 18 based on the deviation between the traveling position and the scheduled traveling position in the automatic traveling control, but is not limited thereto. For example, when a direction of the traveling route is different from a movement direction ((a traveling direction) of the tractor 1 (i.e., a direction of the vehicle body 5), the controller 26 may set the steering angle so that the direction of the vehicle body 5 matches the direction on the traveling route. The controller 26 may determine the final steering angle in the automatic traveling control based on a steering angle obtained based on the deviation (that is, a positional deviation) and a steering angle obtained based on the directional deviation. In the above-described preferred embodiment, the determination of the steering angle in the automatic traveling control is an example, and is not limited thereto.

A communication antenna 34 and a transmitter 35 are connected to the controller 26. The communication antenna 34 wirelessly communicates various types of information, such as start and stop commands (including a temporarily stopping) for automatic traveling, with a remote operation tool that remotely controls the tractor 1 from a remote location. The transmitter 35 is a wireless communication device configured to transmit various types of signals via a wireless communication network established with, for example, a wireless communication terminal such as a mobile or personal computer.

As shown in FIG. 3, the tractor 1 is provided with an obstacle detection unit 36 configured to detect obstacles for the traveling. The obstacle detection unit 36 has a sonar unit 37 including one or more sonars (referred to as obstacle detectors) to detect obstacles around the vehicle body 5 with sonic waves (ultrasonics), and has a laser unit 38 including one or more laser scanners (that is, the obstacle detectors) to detect obstacles around the vehicle body 5 with light waves. The obstacle detection unit 36 may also have a camera unit 39 that includes one or more cameras (that is, imaging equipment) to photograph surroundings of the vehicle body 5.

The sonars are arranged, for example, in such a way that two sonars are provided on each of front, rear, left and right side portions of the tractor 1, so that the sonars are configured to detect obstacles existing in almost the entire circumferential short range area around the vehicle body 5. The laser scanners are arranged, for example, in such a way that two laser scanners are provided at the front portion of the tractor 1 and one laser scanner is at the rear portion, so that the laser scanners are configured to detect obstacles existing in short and long ranges in front of and behind the vehicle body 5. The cameras are arranged in such a way that one camera is provided on each of front, rear, left and right sides of an upper portion of the cabin 9, so that the cameras are configured to shoot the entire circumference area around the vehicle body 5.

The obstacle detectors may be sensors (or ranging sensors) other than sonar and laser scanners.

The controller 26 is operably connected to a plurality of detection information processors 40, an image processor 41, and a monitoring controller (referred to as a monitoring ECU) 42.

The plurality of detection information processors 40 include three units (that is, a first processor 40A, a second processor 40B, and a third processor 40C) in the present preferred embodiment. The sonar unit 37 is operably connected to the detection information processors 40, so that the respective sonars therein transmit information regarding their detected obstacles to the detection information processors 40. The detection information processors 40 perform processing related to the detection information from the sonars (that is, the obstacle detectors). In particular, the detection information processors 40 acquire information detected by the sonars, and perform judgment process to judge whether or not an obstacle is approaching into a short distance range around the vehicle body 5 based on the detection information from the respective sonars. In addition, the respective detection information processors 40 perform the judgment process to judge whether or not an obstacle is approaching into a short distance range around the vehicle body 5 based on time between the transmission and receiving of sonic waves in the respective sonars, and output these judgment results to the controller 26.

The laser unit 38 is operably connected to the controller 26. The laser scanners judge whether or not an obstacle is approaching in a short distance to the vehicle body 5 based on time from the irradiation and receiving of the laser light, and output the judgment results to the controller 26.

The image processor 41 is operably connected to the camera unit 39 so that the image processor 41 processes images captured by the cameras and outputs the processing results to the controller 26.

The monitoring ECU 42 includes a CPU, an electric circuit, an electronic circuit, or/and the like, so that the monitoring ECU 42 obtains obstacle detection results from the controller 26 and controls the automatic traveling based on the obstacle detection results. For example, unless the obstacle detection unit 36 detects any obstacle, the automatic traveling is continued, and when the obstacle detection unit 36 detects an obstacle, the automatic traveling is stopped. More specifically, when the obstacle detection unit 36 detects an obstacle and a distance of the obstacle from the tractor 1 is not more than a predetermined distance, the monitoring ECU 42 cancels the automatic traveling of the tractor 1.

As described above, the monitoring ECU 42 controls movements of the tractor 1 (that is, the vehicle body 5) based on the processing (that is, the judgment) by the detection information processors 40. Specifically, the monitoring ECU 42 controls, based on the judgment by the detection information processors 40, the tractor 1 (that is, the vehicle body 5) to perform an operation to avoid a collision with an obstacle.

The control to be performed by the monitoring ECU 42 when the obstacle detection unit 36 detects an obstacle (when an obstacle is found as approaching the vehicle body 5) will be described in more detail.

In this case, the monitoring ECU 42 controls operations of the speed-shift transmission device 60, the front/rear switching device 61, the PTO clutch 62, and the braking device 63 via the controller 26 connected to the monitoring ECU 42. Specifically, the monitoring ECU 42 shifts the speed-shift transmission device 60 to a deceleration state to reduce a vehicle speed. In addition, the monitoring ECU 42 switches the forward/reverse switching device 61 to a neutral state and activates the braking device 63. In this manner, the automatic traveling of the tractor 1 is stopped. Moreover, the monitoring ECU 42 switches the PTO clutch 62 to a clutch-off state to cut off power transmission from the PTO shaft of the tractor 1 to the working device. In this manner, driving of the working device is stopped.

Figure 4:
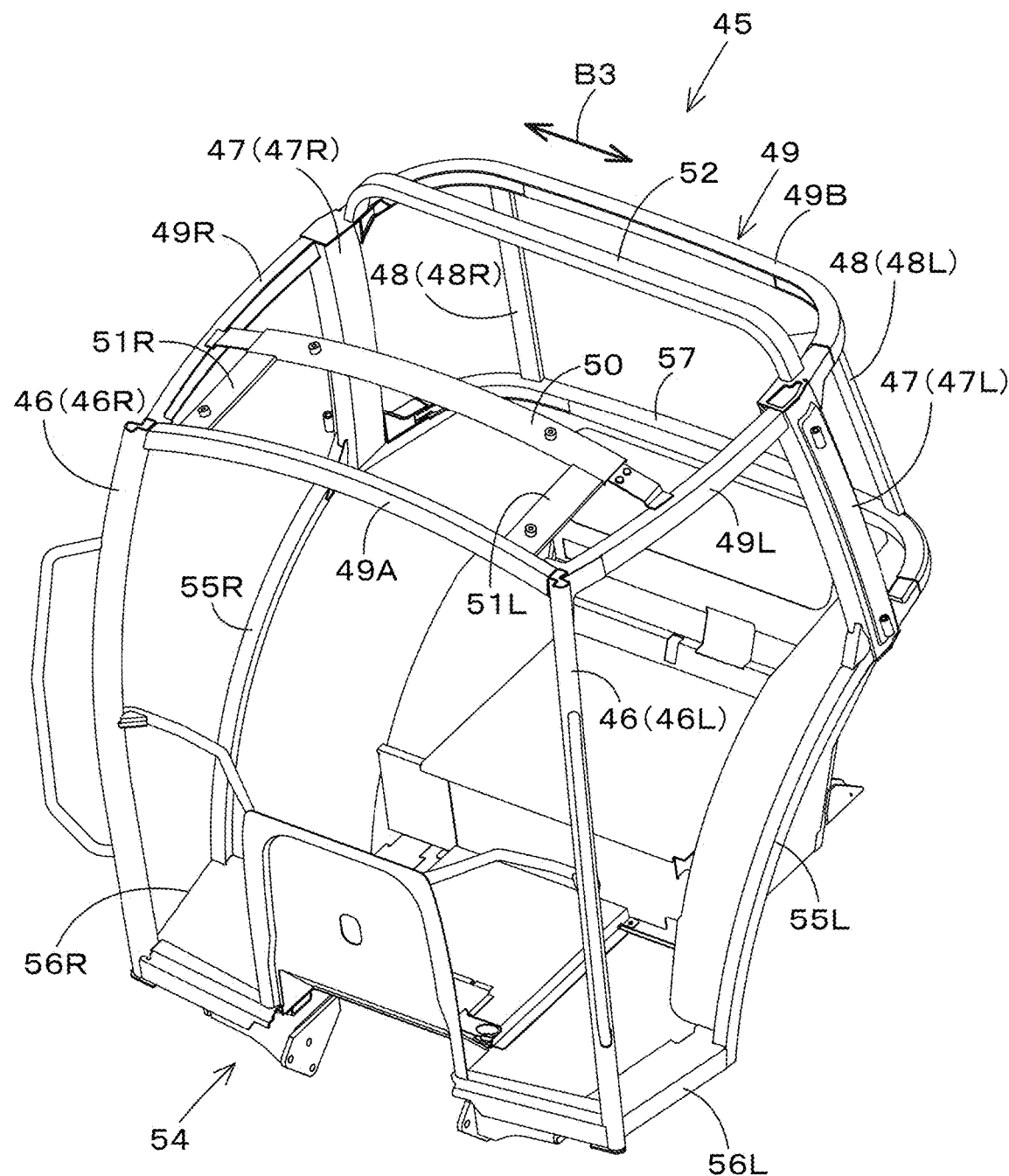
FIG. 4 is a perspective view of a cabin frame seen from the front.
Figure 5:
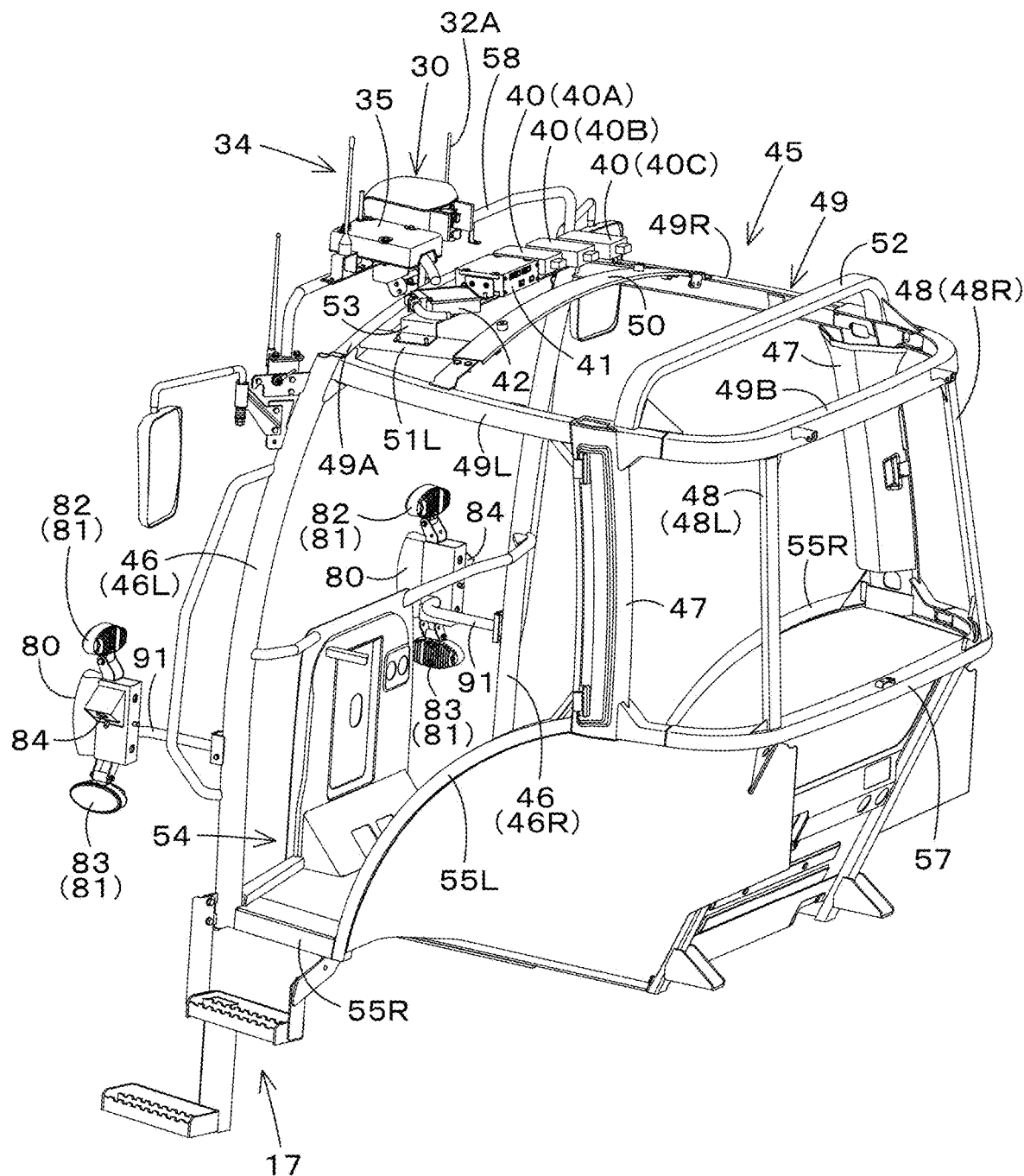
FIG. 5 is a perspective view of the cabin frame seen from the rear.

As shown in FIGS. 4 and 5, the cabin 9 includes a cabin frame 45 defining and functioning as a framework of the cabin 9. The cabin frame 45 includes front pillars 46, center pillars (that is, quarter pillars) 47, rear pillars 48, and an upper frame 49.

The front pillars 46 are arranged above the entrance step 17 (to be higher than the entrance step 17) and at the front portion of the cabin 9. The front pillars 46 include a first front pillar 46L and a second front pillar 46R. The first front pillar 46L is disposed at one side (that is, a left side) in the vehicle-width direction B3 of the front portion of the cabin frame 45 (that is, the cabin 9). The second front pillar 46R is disposed on the other side (that is, a right side) in the vehicle-width direction B3 of the front portion of the cabin frame 45 (that is, the cabin 9). That is, the cabin 9 has the front pillars 46 at the front portion thereof. A front windshield 12 is provided between the first front pillar 46L and the second front pillar 46R.

The center pillars 47 include a first center pillar 47L and a second center pillar 47R. The first center pillar 47L is disposed at a fore-and-aft intermediate portion in one side surface (that is, a left surface side) of the cabin frame 45. The second center pillar 47R is disposed at a fore-and-aft intermediate portion in the other side surface (that is, a right surface side) of the cabin frame 45. An entrance door 14 is provided between the first front pillar 46L and the first center pillar 47L, and another entrance door 14 is provided between the second front pillar 46R and the second center pillar 47R.

The rear pillars 48 include a first rear pillar 48L and a second rear pillar 48R. The first rear pillar 48L is disposed on one lateral side of a back surface of the cabin frame 45. The second rear pillar 48R is disposed on the other lateral side of the back surface of the cabin frame 45. A rear glass is provided between the first rear pillar 48L and the second rear pillar 48R. A rear side glass 15 is provided between the first center pillar 47L and the first rear pillar 48L, and another rear side glass 15 is provided between the second center pillar 47R and the second rear pillar 48R.

A roof 16 is attached to the upper frame 49. In this manner, the roof 16 is supported on the upper frame 49. The upper frame 49 includes a front upper frame 49A, a first side upper frame 49L, a second side upper frame 49R, and a rear upper frame 49B.

The front upper frame 49A connects upper portions of the first front pillar 46L and the second front pillar 46R. The first side upper frame 49L connects upper portions of the first front pillar 46L and the first center pillar 47L. The second side upper frame 49R connects upper portions of the second front pillar 46R and the second center pillar 47R. The rear upper frame 49B connects upper portions of the first center pillar 47L and the second center pillar 47R and connects upper portions of the first rear pillar 48L and the second rear pillar 48R.

The front upper frame 49A supports a front portion of the roof 16. The rear upper frame 49B supports a rear portion of the roof 16. The first side upper frame 49L supports a left portion of the roof 16, i.e., one vehicle (or vehicle body 5)—width directional side portion of the roof 16. The second side upper frame 49R supports a right portion of the roof 16, i.e., the other vehicle-width directional side of the roof 16.

As shown in FIG. 4, the upper frame 49 is provided at a front portion thereof with a connecting frame 50 interposed between the first side upper frame 49L and the second side upper frame 49R. The connecting frame 50 is joined at one end thereof to the front upper frame 49A by a first reinforcing frame 51L, and at the other end thereof to the front upper frame 49A by a second reinforcing frame 51R. The upper frame 49 is provided at a rear portion thereof with a bridging frame 52 bridged between the left and right front end portions of the rear upper frame 49B.

Lower portions of the first front pillar 46L and the second front pillar 46R are connected to each other by the frame member 54. Lower portions of the first front pillar 46L and the first center pillar 47L are connected to each other by frame members 55L and 56L. Lower portions of the second front pillar 46R and the second center pillar 47R are connected to each other by frame members 55R and 56R. Lower portions of the first center pillar 47L and the second center pillar 47R are connected to each other by a frame member 57.

Figure 6:
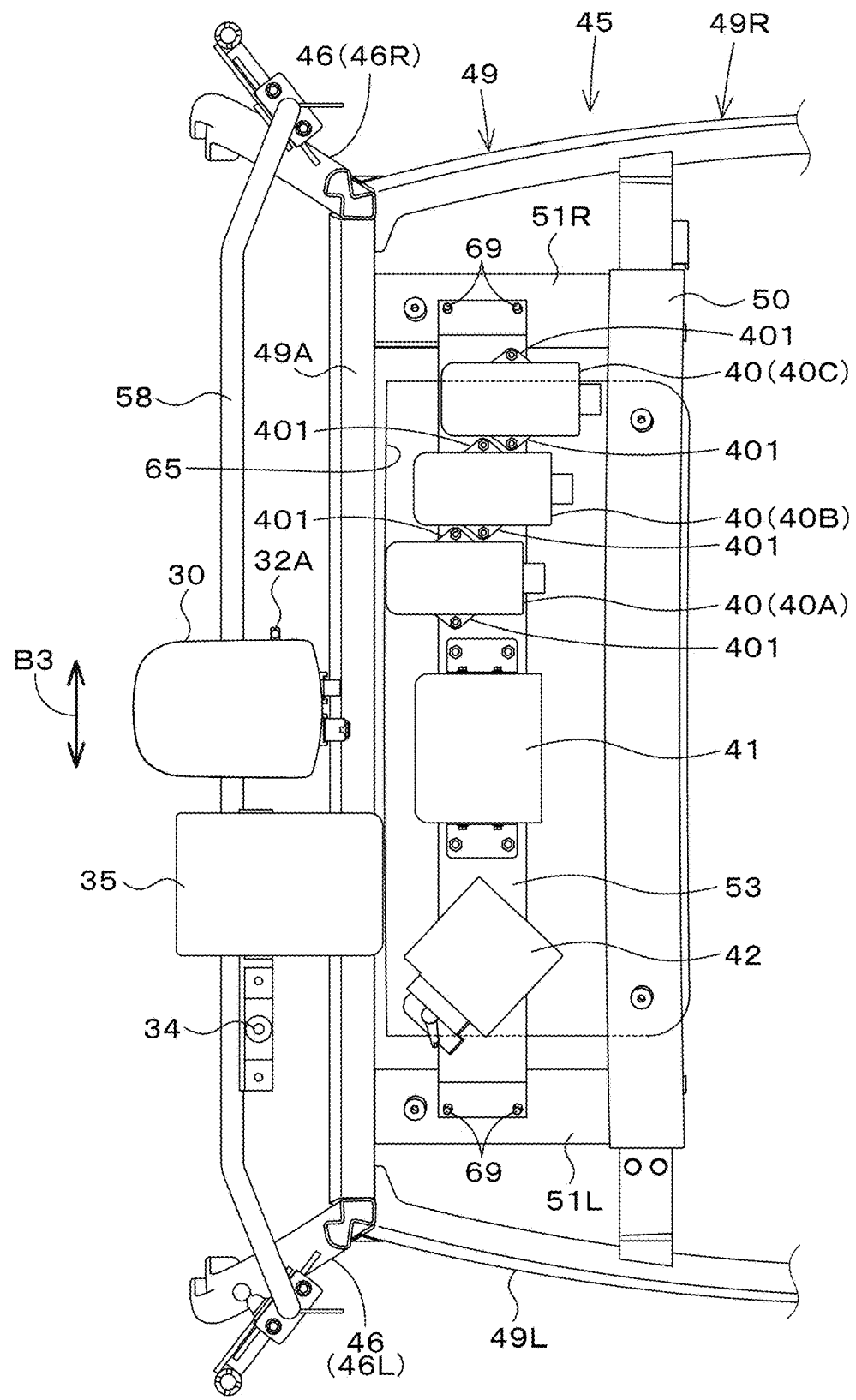
FIG. 6 is a plan view of a front portion of the cabin frame without an outer roof.

As shown in FIGS. 5 and 6, an attachment frame 53 is interposed between the first and second reinforcing frames 51L and 51R. The detection information processors 40 (that is, the first processor 40A, the second processor 40B, the third processor 40C), the image processor 41, and the monitoring ECU 42 are collectively and laterally juxtaposed and are mounted on the attachment frame 53. The first processor 40A, the second processor 40B, and the third processor 40C are provided respective plate-shaped attaching portions 401. Each attaching portion 401 has a triangular shape in plan view. The attaching portions 401 are attached to the attachment frame 53 by fasteners such as bolts. In this manner, the first processor 40A, the second processor 40B, and the third processor 40C are attached to the attachment frame 53.

The attachment frame 53 defines and functions as a support body defining a later-discussed housing space S3 in which the detection information processors 40, the image processor 41, and the monitoring ECU 42 are supported. Hereafter, the attachment frame 53 may be referred to as a support body 53.

The attachment frame (that is, the support body) 53 is attached to the first reinforcing frame 51L at one side (that is, the left side) in the vehicle-width direction and to the second reinforcing frame 51R at the other side (that is, the right side) in the vehicle-width direction. The attachment frame (that is, the support body) 53 is detachably attached to the first reinforcing frame 51L and the second reinforcing frame 51R by attaching tools 69 such as bolts and nuts.

As described above, the detection information processors (that is, the first processor 40A, the second processor 40B, the third processor 40C), the image processor 41, and the monitoring ECU 42 are attached to the attachment frame (that is, the support body) 53. Therefore, the detection information processors 40, the image processor 41, and the monitoring ECU 42 can be collectively assembled together with the attachment frame (that is, the support body) 53, and can be fixed to the cabin 9. In this manner, time required for assembly work can be shortened. In addition, the layout of wiring between the devices (that is, the detection information processors 40 (the first processor 40A, the second processor 40B, the third processor 40C), the image processor 41, and the monitoring ECU 42) can be simplified so as to make the wiring easy.

As shown in FIG. 6, the detection information processors (the first processor 40A, the second processor 40B, and the third processor 40C), the image processor 41, and the monitoring ECU 42 are aligned in the vehicle-width direction. In the present preferred embodiment, the monitoring ECU 42, the image processor 41, and the detection information processors 40 are aligned in this order from the one vehicle-width directional side (that is, the left side) to the other vehicle-width directional side (that is, the right side). The plurality of (three) detection information processors 40 are juxtaposed in the vehicle-width direction, and are offset in the fore-and-aft direction. In this manner, the attaching portions 401 of the first processor 40A, second processor 40B, and third processor 40C can be prevented from interfering with each other, while the first processor 40A, the second processor 40B, and the third processor 40C can be adjoined to each other in the vehicle-width direction. Therefore, even when the plurality of detection information processors 40 are arranged side by side in the vehicle-width direction, the space occupied by the plurality of detection information processors 40 in the vehicle-width direction can be reduced.

When there are three or more detection information processors 40, as those in the present preferred embodiment, the three or more detection information processors 40 are aligned and are offset rearward (or forward), as they extend from the one vehicle-width directional side to the other vehicle-width directional side. In other words, the three or more detection information processors 40 are aligned on a diagonal straight line (i.e., in a direction inclined relative to the fore-and-aft direction and the vehicle-width direction) in plan view.

The monitoring ECU 42 is arranged facing the diagonal direction in plan view. Specifically, the monitoring ECU 42 extends from the one vehicle-width directional side (the left side) to the other vehicle-width directional side (the right side) as it extends from its front end to its rear end. This arrangement makes it easy to arrange the wiring connected to the monitoring ECU 42.

The position detector 30 is arranged in front of a center portion in the vehicle-width direction B3 of the front upper frame 49A. The position detector 30 is arranged in front of the roof 16 and in front of the detection information processors 40, the image processor 41, and the monitoring ECU 42. The position detector 30 is disposed closest to the image processor 41 among the detection information processors 40, the image processor 41, and the monitoring ECU 42. The transmitter 35 is arranged on the one lateral side (that is, the left side) of the position detector 30. The communication antenna 34 is arranged on the one lateral side (that is, the left side) of the transmitter 35. The position detector 30, the transmitter 35, and the communication antenna 34 are aligned in the vehicle-width direction in front of the roof 16. The position detector 30, the transmitter 35, and the communication antenna 34 are attached to a support frame 58 interposed between the upper portion of the first front pillar 46L and the upper portion of the second front pillar 46R. The support frame 58 is attached at one end thereof to the first front pillar 46L, and is at the other end thereof to the second front pillar 46R.

Figure 7:
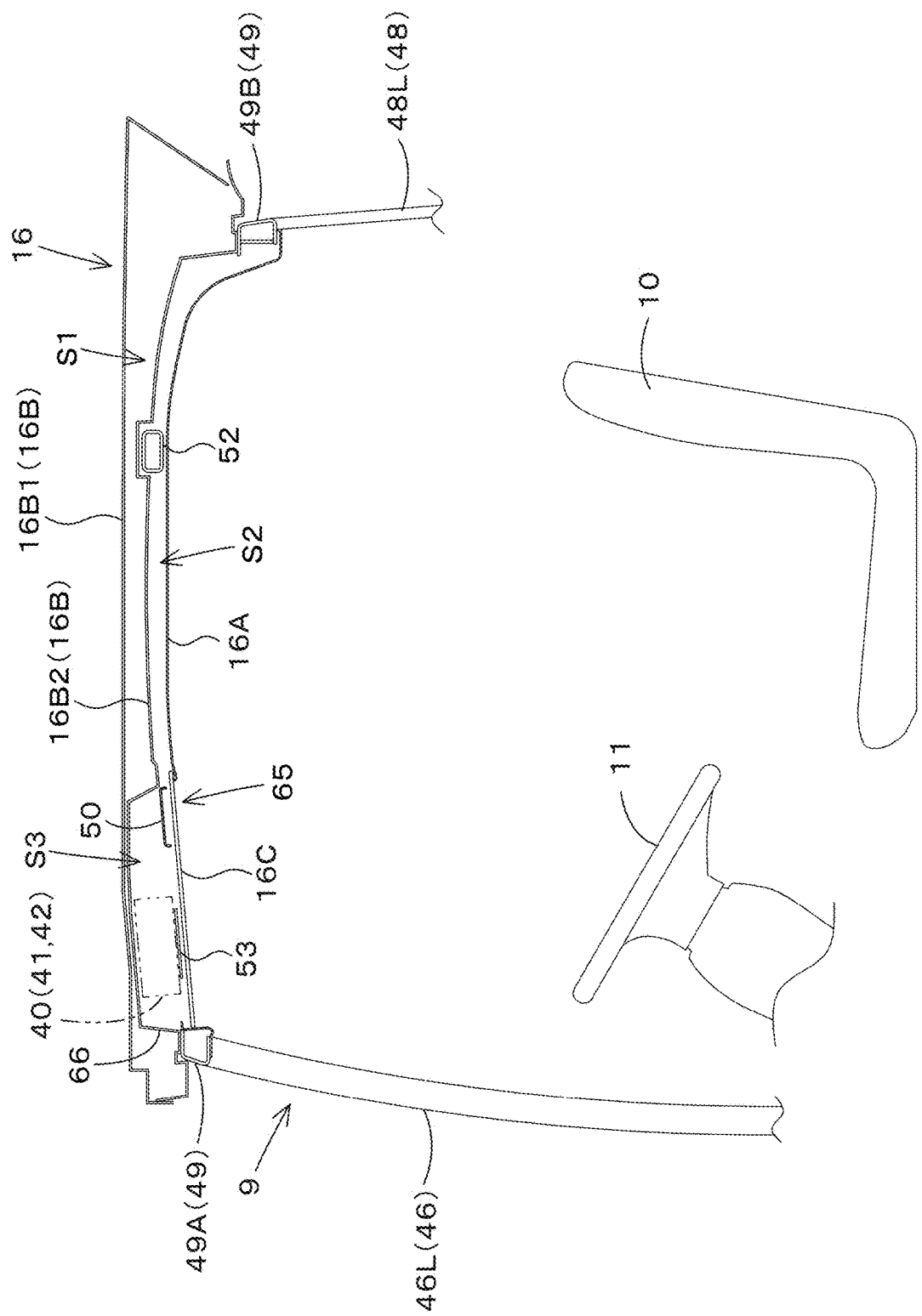
FIG. 7 is a side view showing a partial cross section of a driver seat and a handling wheel, which shows a positional relation between the driver seat and the handling wheel.
Figure 8:
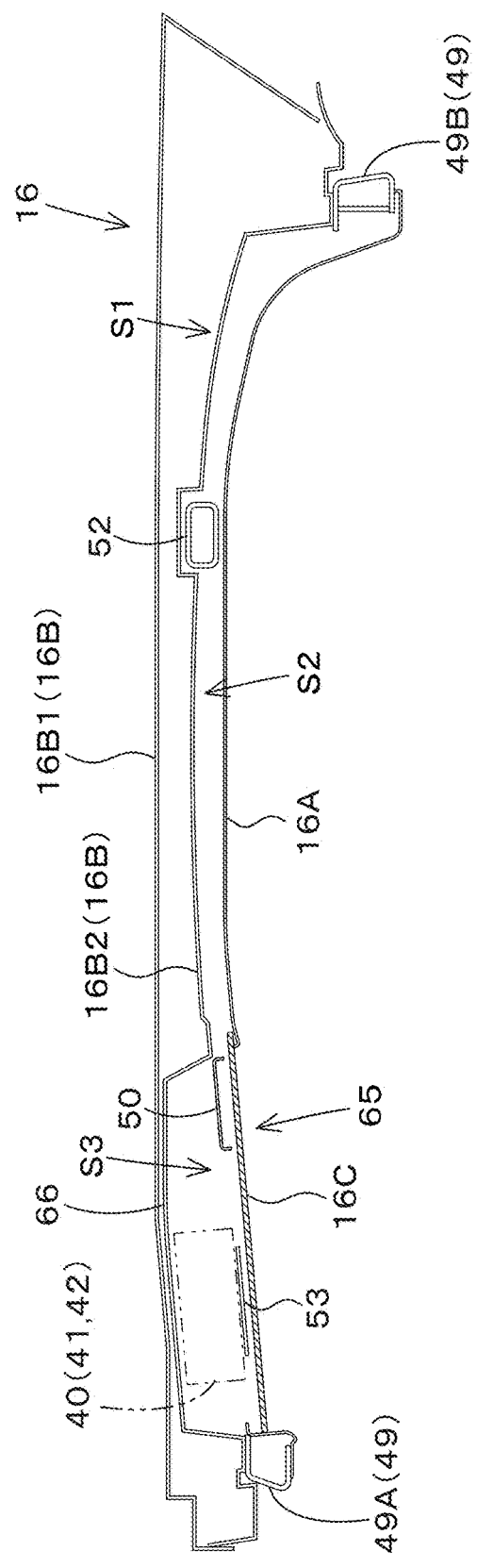
FIG. 8 is a side cross section view showing an inner configuration of a roof.
Figure 9:
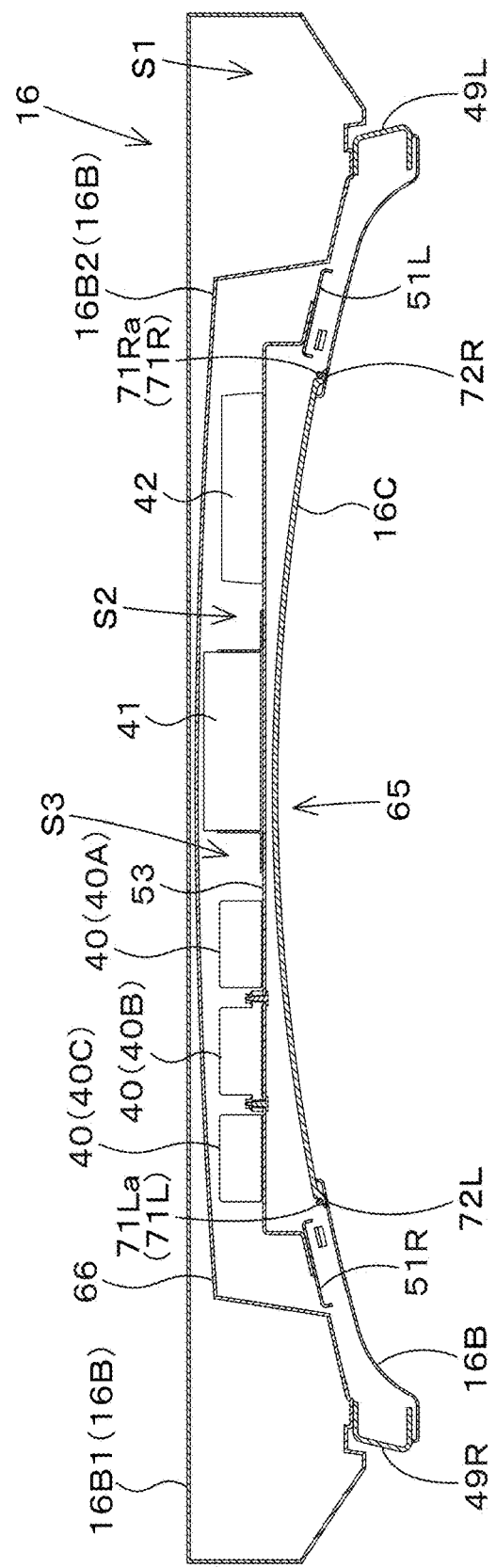
FIG. 9 is a front cross section view showing the inner configuration of the roof.
Figure 10:
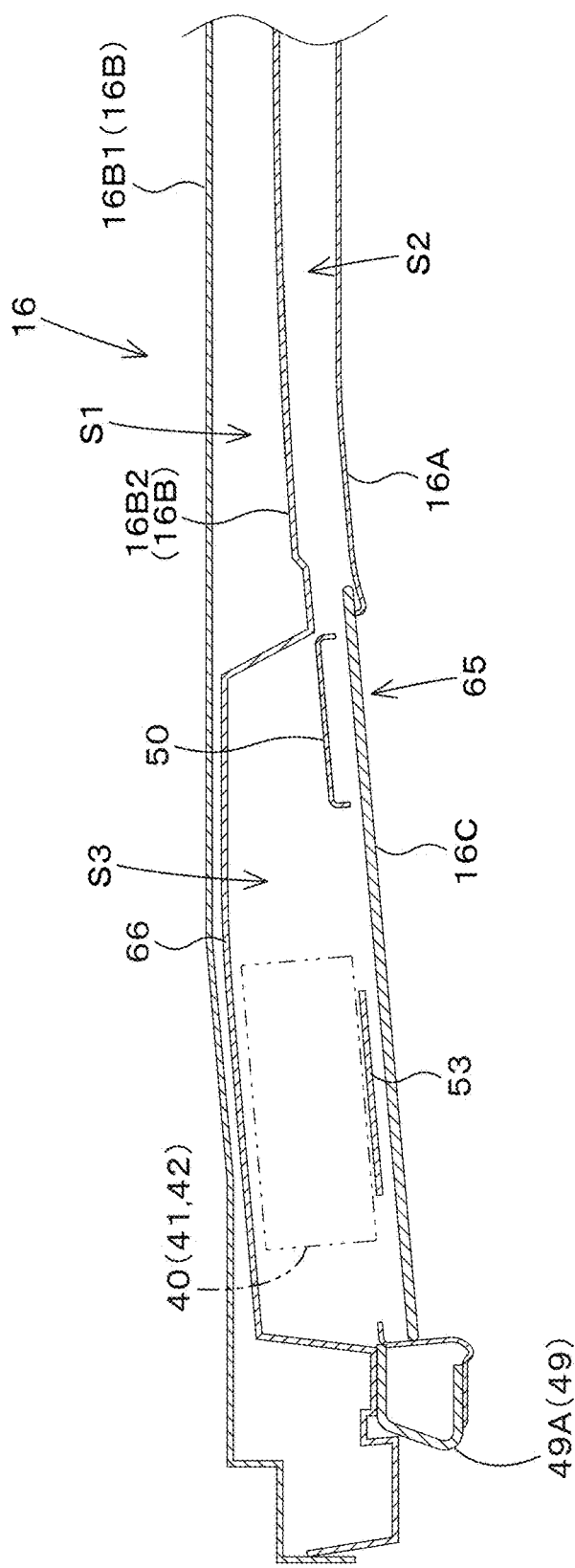
FIG. 10 is a side cross section view showing a state where a movable board is positioned at a first position to close an opening portion.

As shown in FIGS. 7 to 9, the roof 16 includes an inner roof 16A, an outer roof 16B, and a movable plate 16C.

The inner roof 16A is arranged at a lower portion of the roof 16. A front portion of the inner roof 16A is joined to a lower portion of the front upper frame 49A. A rear portion of the inner roof 16A is joined to a lower portion of the rear upper frame 49B. A left portion of the inner roof 16A is joined to a lower portion of the first side upper frame 49L. A right portion of the inner roof 16A is joined to a lower portion of the second side upper frame 49R.

Figure 11:
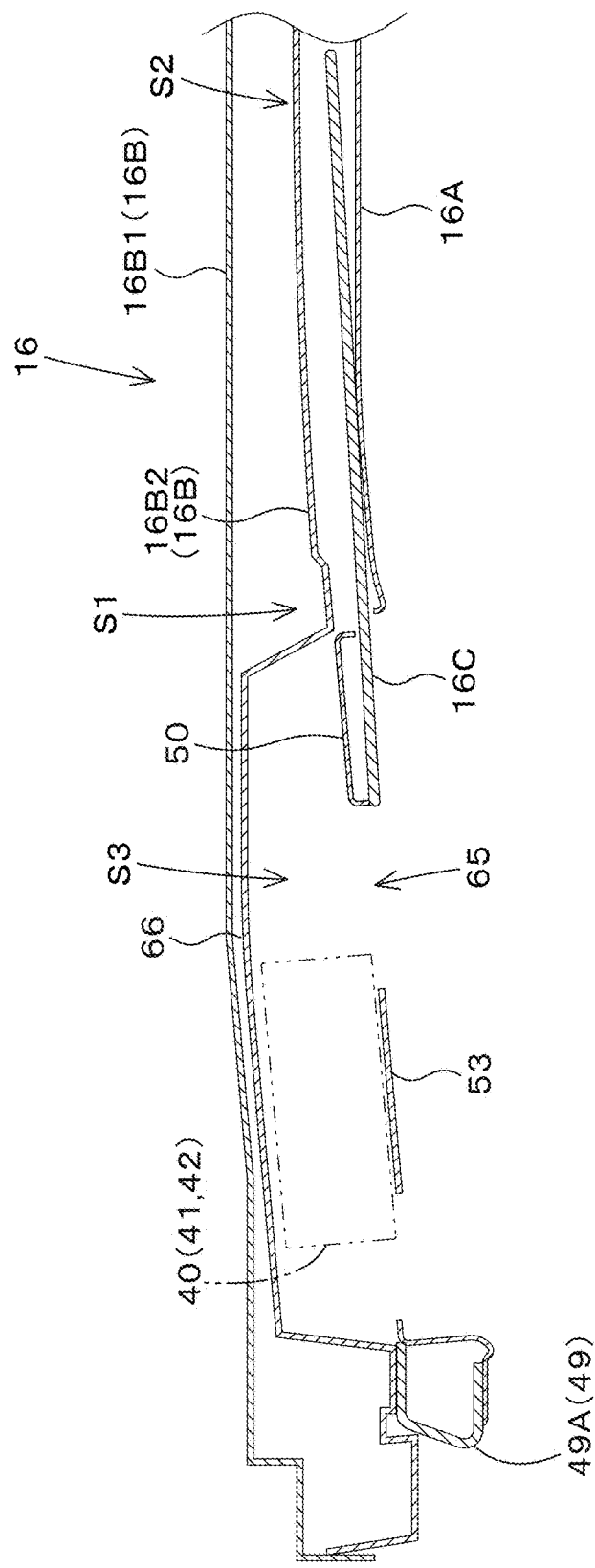
FIG. 11 is a side cross section view showing a state where the movable board is positioned at a second position to open the opening portion.
Figure 12:
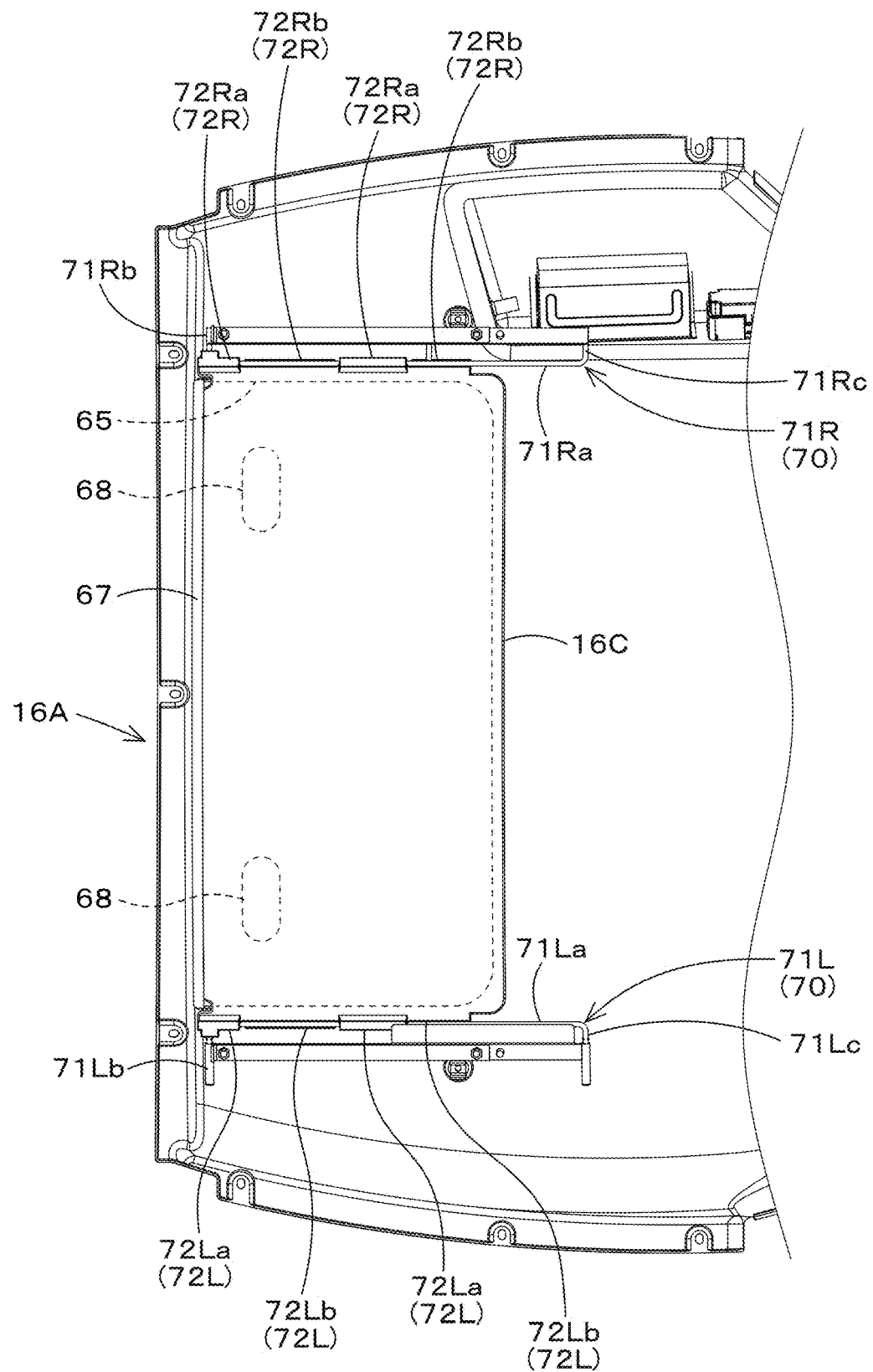
FIG. 12 is a plan view showing the state where the movable board is positioned at the first position to close the opening portion.
Figure 13:
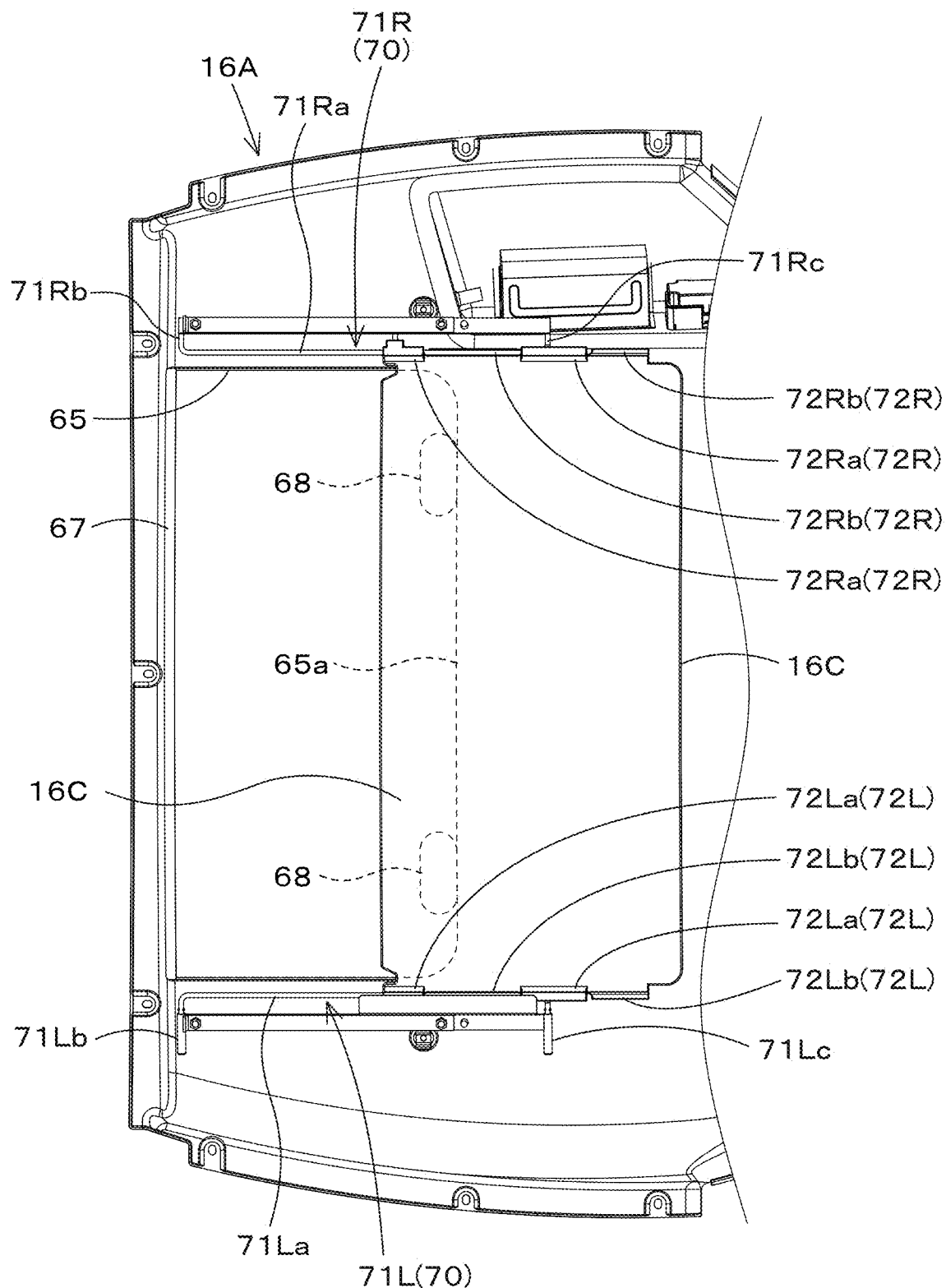
FIG. 13 is a plan view showing the state where the movable board is positioned at the second position to open the opening portion.

As shown in FIGS. 6 to 13, the inner roof 16A has an opening 65 at the front portion thereof. As shown in FIGS. 6, 12, and 13, the opening 65 is formed in a rectangular shape in a plan view such that its vehicle-width directional length is longer than its fore-and-aft length. The vehicle-width directional length of the opening 65 is longer than half of a vehicle-width directional length of the front end portion of the roof 16. As shown in FIG. 7, the opening 65 is arranged above the steering wheel 11 and is arranged forward of the driver seat 10 in the fore-and-aft direction. The opening 65 faces the interior of the cabin 9 and is accessible from the interior of the cabin 9.

The outer roof 16B is arranged to cover an upper portion of the inner roof 16A. The outer roof 16B includes an upper member 16B1 and a lower member 16B2. The upper member 16B1 defines an upper surface of the outer roof 16B. The lower member 16B2 defines a lower surface of the outer roof 16B. The upper member 16B1 and the lower member 16B2 are integrated by welding, bolting, or other structures or methods. A space S1 is provided between the upper member 16B1 and the lower member 16B2.

As shown in FIGS. 7 and 8, an upwardly raised bulging portion 66 is located on the front portion of the lower member 16B2. The bulging portion 66 is provided above the opening 65. The bulging portion 66 is raised toward the upper member 16B1 and is closer to the upper member 16B1 than any other portions in the lower member 16B2. In this manner, the space S1 between the upper member 16B1 and the lower member 16B2 is smaller at the front portion of the roof 16 than that at the rear portion of the roof 16.

As shown in FIGS. 8 and 9, the bulging portion 66 extends longer in the vehicle-width direction than in the fore-and-aft direction. The vehicle-width directional length of the bulging portion 66 is longer than the vehicle-width directional length of the opening 65. The bulging portion 66 has a fore-and-aft length equal to the fore-and-aft length of the opening 65.

A front portion of the outer roof 16B is joined to an upper portion of the front upper frame 49A. A rear portion of the outer roof 16B is joined to an upper portion of the rear upper frame 49B. A left portion of the outer roof 16B is joined to an upper portion of the first side upper frame 49L. A right portion of the outer roof 16B is joined to an upper portion of the second side upper frame 49R.

As shown in FIGS. 7 to 9, the outer roof 16B defines a space S2 between the outer roof 16B and the inner roof 16A. The space S2 is located below the lower member 16B2 of the outer roof 16B and above the inner roof 16A.

A front portion of the space S2 between the outer roof 16B and the inner roof 16A defines a housing space S3 to house the detection information processors 40, the image processor 41, and the monitoring ECU 42. The housing space S3 is provided in the front portion of the roof 16. The housing space S3 is disposed above the opening 65. Since the bulging portion 66 is located above the opening 65, the housing space S3 is enlarged upwardly compared to the other portions in the space S2 (that is, a rear portion and a fore-and-aft intermediate portion). That is, the housing space S3 is provided above the opening 65.

As shown in FIGS. 8 and 9, the vehicle-width directional length of the housing space S3 is longer than the vehicle-width directional length of the opening 65. The fore-and-aft length of the housing space S3 is equal to the fore-and-aft length of the opening 65. The housing space S3 is located at a position where the housing space S3 vertically overlaps the opening 65. Thus, it is possible to access the housing space S3 through the opening 65 when the opening 65 is not closed by the movable plate 16 (see FIG. 11).

Figure 14:
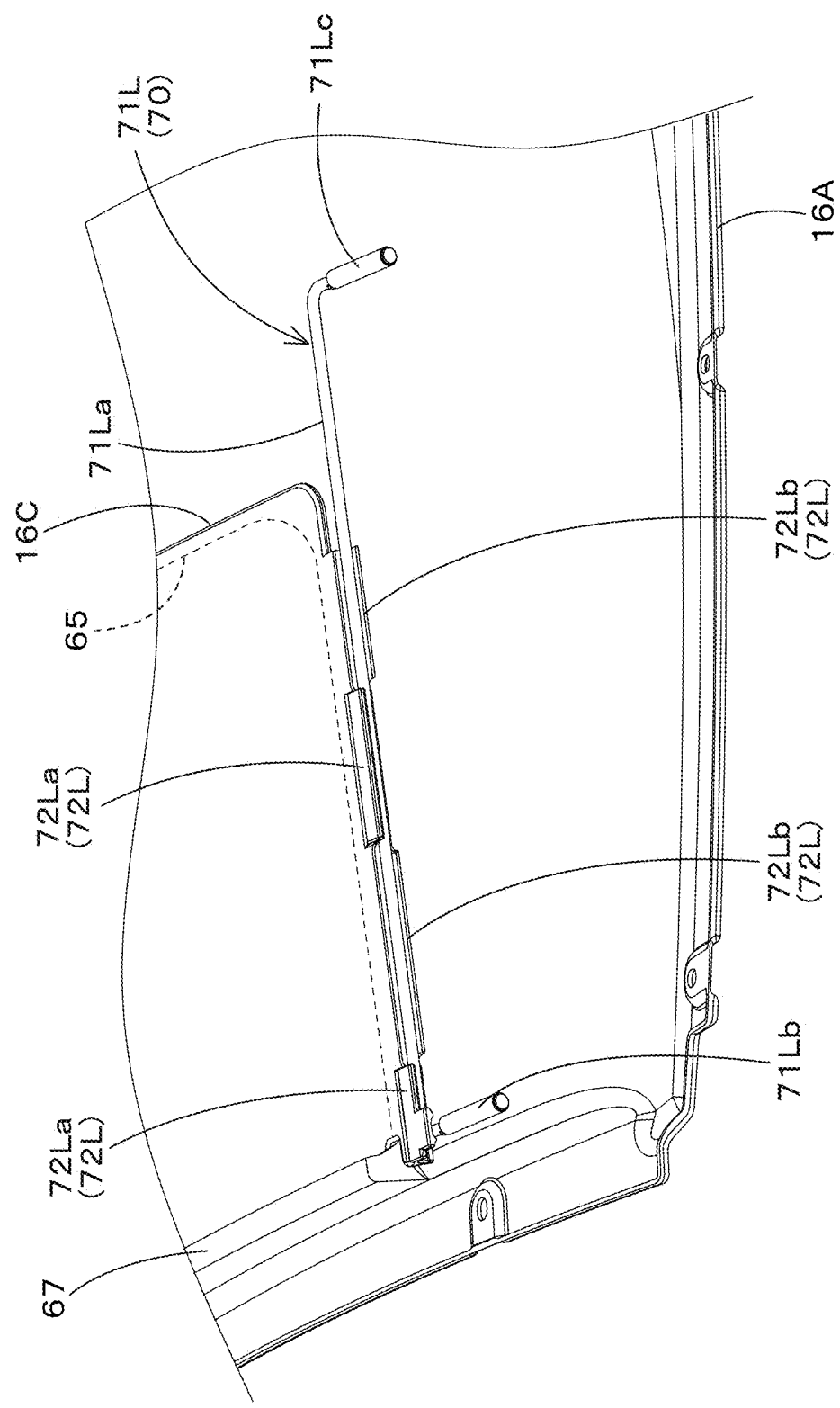
FIG. 14 is a perspective view showing a left front portion of an inner roof, which shows the movable board and a guide mechanism.

As shown in FIGS. 12 to 14, a guide mechanism 70 is provided on an upper surface of the inner roof 16A to slidably support the movable plate 16C. The guide mechanism 70 guides a sliding movement of the movable plate 16C in the fore-and-aft direction.

The guide mechanism 70 has a first guide member 71L and a second guide member 71R. The first guide member 71L is provided on the one vehicle-width directional side (that is, the left side) of the inner roof 16A. The second guide member 71R is provided on the other vehicle-width directional side (that is, the right side) of the inner roof 16A. A bent bar-shaped body defines and functions as each of the first guide member 71L and the second guide member 71R.

The first guide member 71L includes a first rail portion 71La, a first front end portion 71Lb, and a first rear end portion 71Lc. The first rail portion 71La extends in the fore-and-aft direction. The first front end portion 71Lb is bent from a front end of the first rail portion 71La and extends outward in the vehicle-width direction (i.e., leftward). The first rear end portion 71Lc is bent from a rear end of the first rail portion 71La and extends outward in the vehicle-width direction (i.e., leftward). The first front end portion 71Lb and the first rear end portion 71Lc are fixed to the upper surface of the inner roof 16A. In this manner, the first guide member 71L is fixed positionally in the fore-and-aft direction.

The second guide member 71R includes a second rail portion 71Ra, a second front end portion 71Rb, and a second rear end portion 71Rc. The second rail portion 71Ra extends in the fore-and-aft direction and in parallel to the first rail portion 71La. The second front end portion 71Rb is bent from a front end of the second rail portion 71Ra and extends outward in the vehicle-width direction (i.e., rightward). The second rear end portion 71Rc is bent from a rear end of the second rail portion 71Ra and extends outward in the vehicle-width direction (i.e., rightward). The second front end portion 71Rb and the second rear end portion 71Rc are fixed to the upper surface of the inner roof 16A. In this manner, the second guide member 71R is fixed positionally relative to the inner roof 16A in the fore-and-aft direction.

The movable plate 16C is a plate sized and shaped to cover the opening 65 from above. As shown in FIGS. 12 and 13, the movable plate 16C has a rectangular shape in plan view in which a vehicle-width directional length is longer than a fore-and-aft length. The movable plate 16C includes support portions (including a first support portion 72L and a second support portion 72R) that are supported by the guide mechanism 70. The first support portion 72L is provided at a left edge of the movable plate 16C and is supported by the first rail portion 71La of the first guide member 71L. The second support portion 72R is provided at a right edge of the movable plate 16C and is supported by the second rail portion 71Ra of the second guide member 71R.

Since the first support portion 72L and the second support portion 72R have similar configurations, the configuration of the first support portion 72L will be representatively described below.

As shown in FIG. 14, the first support portion 72L includes upper support portions 72La and lower support portions 72Lb. The upper support portions 72La are in contact with an upper portion of the first rail portion 71La. The lower support portions 72Lb are in contact with a lower portion of the first rail portion 71La. The first rail portion 71La is supported by the upper support portions 72La and the lower support portions 72Lb, that is, sandwiched between the upper and lower support portions 72La and 72Lb from above and below. The upper support portions 72La and the lower support portions 72Lb are arranged alternately in the fore-and-aft direction. In the present preferred embodiment, two upper support portions 72La and two lower support portions 72Lb are arranged so that one upper support portion 72La, one lower support portion 72Lb, the other upper support portion 72La, and the other lower support portion 72Lb are aligned in this order from the front to the rear.

In the above-described configuration, the first support portion 72L is supported on the first rail portion 71La movably in the fore-and-aft direction but immovably vertically relative to the first rail portion 71La. The second support portion 72R has the similar configuration to the first support portion 72L, and is supported on the second rail portion 71Ra movably in the fore-and-aft direction but immovably vertically relative to the second rail portion 71Ra.

In this manner, the movable plate 16C is movable in the fore-and-aft direction along the first rail portion 71La and the second rail portion 71Ra. Due to the mobility of the movable plate 16C in the fore-and-aft direction, the movable plate 16C is shiftable between the first position to close the opening 65 (see FIGS. 10 and 12) and the second position to open the opening 65 (see FIGS. 11 and 13).

As shown in FIGS. 12 to 14, the front portion of the inner roof 16A is provided with an upper protrusion 67 projects downward from an upper surface thereof. As shown in FIG. 12, the upper protrusion 67 when abutting against the movable plate 16C moved forward prevents the movable plate 16C from moving further forward. In this manner, the foremost position (that is, the first position) of the movable plate 16C is defined.

As shown in FIGS. 12 and 13, the front portion of the movable plate 16C is provided with a lower protrusion 68 projecting downward from a lower surface thereof. As shown in FIG. 13, the lower protrusion 68 when abutting against the movable plate 16C moved backward prevents the movable plate 16C from moving further backward. In this manner, the rearmost position (that is, the second position) of the movable plate 16C is defined.

The operation of moving the movable plate 16C back and forth between the first position (see FIG. 12) and the second position (see FIG. 13) can be performed manually by an operator's hand inserted into the opening 65 from the inside of the cabin 9. However, the movable plate 16C may be moved by power of a drive source such as a motor.

As shown in FIGS. 6 to 11, the detection information processors 40, the image processor 41, and the monitoring ECU 42 are arranged in the housing space S3. In this manner, the detection information processors 40, the image processor 41, and the monitoring ECU 42 are arranged at the front inside portion of the roof 16.

The detection information processors 40, the image processor 41, and the monitoring ECU 42 are arranged above the opening 65. As shown in FIG. 6, the detection information processors 40, the image processor 41, and the monitoring ECU 42 overlap the opening 65 in plan view. As shown in FIG. 8, the detection information processors 40, the image processor 41, and the monitoring ECU 42 are located above the movable plate 16C when the movable plate 16C is set at the first position (that is, a closing position).

As shown in FIG. 6, the attachment frame (that is, the support body) 53 supports, above the opening 65, the detection information processors 40, the image processor 41, and the monitoring ECU 42. The attachment frame (that is, the support body) 53 extends across the opening 65 from the one side to the other side in the vehicle-width direction. In other words, the attachment frame (that is, the support body) 53 extends in the vehicle-width direction above the opening 65. In this manner, the detection information processors 40, the image processor 41, and the monitoring ECU 42 are supported by the attachment frame (that is, the support body) 53 so that they are aligned in the vehicle-width direction above the opening 65. That is, above the opening 65, the attachment frame (that is, the support body) 53 supports the detection information processors 40, the image processor 41, and the monitoring ECU 42 which are aligned in the vehicle-width direction.

As shown in FIGS. 11 and 13, by moving the movable plate 16C to the second position, the opening 65 is opened to the inside of the cabin 9, so that the housing space S3 can be accessed from the inside of the cabin 9 through the opening 65 to allow the detection information processors 40, the image processor 41, and the and the monitoring ECU 42 which are arranged in the housing space S3 to be accessed. Thus, it becomes possible to easily perform maintenance and other works on the detection information processors 40, image processor 41, and monitoring ECU 42.

The roof 16 has a locking mechanism (not shown in the drawings) to lock the movable plate 16C at the first position (that is, the closing position). The movable plate 16C is normally locked at the first position (that is, the closing position) so that it is immovable unless it is unlocked. The locking can be released only by a person in charge of maintenance.

As shown in FIGS. 1, 2, 5, and 15, the tractor 1 is provided with lamps to be lighted on a peripheral portion of the vehicle body 5. The lamps include a combination lamp 80 and work lamps 81.

The combination lamp 80 is a unit including a combination of a plurality of lamps. In the present preferred embodiment, the combination lamp 80 is a front combination lamp provided at the front portion of the tractor 1. The plurality of lamps included in the combination lamp 80 are, for example, position lamps, turn-signal lamps, and hazard lamps.

The position lamps are adaptable to inform people around the vehicle of the presence and width of the vehicle when the vehicle is stopped, and are also referred to as vehicle-width lamps, small lamps, or clearance lamps. Turn-signal lamps are direction indicators that show turn directions of the tractor. The hazard lamps are the left and right turn-signal lamps flashing simultaneously for the purpose of alerting the following vehicles.

The plurality of lamps included in the combination lamp 80 need only include two or more of the position lamps, turn-signal lamps, and hazard lamps, and may include all of the position lamps, turn-signal lamps, and hazard lamps. In the present preferred embodiment, the plurality of lamps included in the combination lamp 80 includes the position lamps and the turn-signal lamps.

The work lamps 81 are lamps that illuminate the vicinity of the vehicle body 5 when working at dusk or at night, and are referred to as work lamps for this reason. The work lamps 81 include headlamps 82 that illuminate front areas of the vehicle body 5 and/or sidelamps 83 that illuminate side areas of the vehicle body 5 (outward in the vehicle-width direction). In the present preferred embodiment, the work lamps 81 include headlamps 82 and sidelamps 83.

Figure 15:
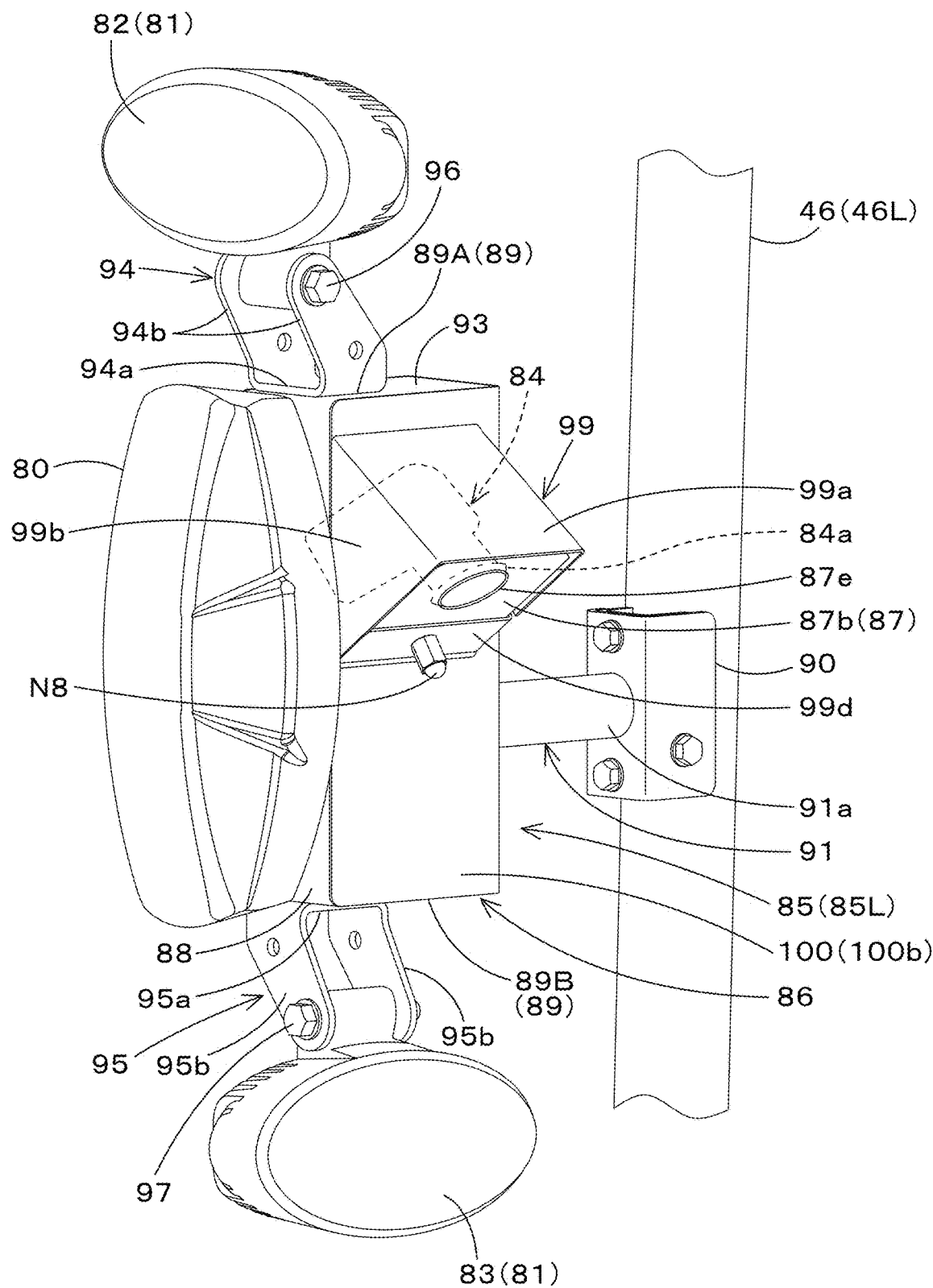
FIG. 15 is a perspective view showing an attachment configuration of an obstacle detector, a combination lamp, and a work lamp.

As shown in FIG. 1, FIG. 2, FIG. 15, and the like, the obstacle detectors 84, combination lamps 80, and work lamps 81 are mounted on the vehicle body 5 via respective attachment brackets 85. The attachment brackets 85 are attached to the front pillars 46. Among the sonars included in the sonar unit 37, the sonars included in the obstacle detectors 84 are provided on the left side and right side of the tractor 1.

As shown in FIGS. 1 and 2, the obstacle detectors 84 are arranged leftwardly and rightwardly forward of the cabin 9. The obstacle detector 84 arranged leftwardly forward of the cabin 9 and the obstacle detector 84 arranged rightwardly forward of the cabin 9 are arranged symmetrically relative to the width directional center line of the tractor 1.

The obstacle detectors 84 are arranged on opposite width directional outer sides of the vehicle body 5 and between the front wheels 2 and the rear wheels 3. More specifically, the obstacle detectors 84 are located on opposite width directional outer sides of the hood 8 and between the front wheels 2 and the rear wheels 3. In the present preferred embodiment, the obstacle detector 84 arranged leftwardly forward of the cabin 9 is positioned in the fore-and-aft direction forward of the left entrance step 17 and rearward of the left front wheel 2L. The obstacle detector 84 arranged rightwardly forward of the cabin 9 is positioned in the fore-and-aft direction forward of the right side entrance step 17 and rearward of the right front wheel 2R.

As shown in FIG. 1, the obstacle detectors 84 are arranged below the upper end of the hood 8 and above the lower end of the cabin 9.

By arranging the obstacle detectors 84 at the above-mentioned positions, it is possible to reliably detect obstacles in positions that are difficult to be found from the driver seat 10.

As shown in FIGS. 1 and 2, the combination lamps 80 and work lamps 81 are arranged leftwardly and rightwardly forward of the cabin 9. The combination lamp 80 and work lamps 81 arranged leftwardly forward of the cabin 9 and the combination lamp 80 and work lamps 81 arranged rightwardly forward of the cabin 9 are arranged symmetrically relative to the width directional center line of the tractor 1.

The combination lamps 80 and the work lamps 81 are arranged at opposite width directional outer sides of the vehicle body 5 and between the front wheels 2 and the rear wheels 3. More specifically, the combination lamps 80 and the work lamps 81 are arranged at opposite vehicle-width directional outer sides of the hood 8 and between the front wheels 2 and the rear wheels 3. In the present preferred embodiment, the combination lamp 80 and the work lamps 81 arranged leftwardly forward of the cabin 9 are positioned in the fore-and-aft direction forward of the left entrance step 17 and rearward of the left front wheel 2L. The combination lamp 80 and work lamps 81 arranged rightwardly forward of the cabin 9 are positioned in the fore-and-aft direction forward of the right entrance step 17 and rearward of the right front wheel 2R.

As shown in FIG. 1, the combination lamps 80 and the work lamps 81 are arranged below the upper end of the hood 8 and above the lower end of the cabin 9.

By arranging the combinations lamp 80 and the work lamps 81 at the above-mentioned positions, it is possible to reliably illuminate areas outward in the vehicle-width direction from the hood 8 and between the front wheels 3 and the rear wheels 4 (the vicinity of the entrance step 17).

The attachment brackets 85 to attach the obstacle detectors 84, combination lamps 80, and work lamps 81 to the vehicle body 5 include an attachment bracket 85L and an attachment bracket 85R. The attachment bracket 85L is attached to the left side of the vehicle body 5. The attachment bracket 85R is attached to the right side of the vehicle body 5.

Each attachment bracket 85 includes an attachment body 86. The attachment body 86 includes a detector-attaching portion and lamp-attaching portions. The lamp-attaching portions include a first lamp-attaching portion 88 and second lamp-attaching portions 89. The obstacle detector 84 is attached to the detector-attaching portion 87. The combination lamp 80 is attached to the first lamp-attaching portion 88. The work lamps 81 are attached to the second lamp-attaching portions 89.

The first lamp-attaching portion 88 is provided at a front portion of the attachment body 86. The second lamp-attaching portions 89 include an upper attaching portion 89A and a lower attaching portion 89B. The upper attaching portion 89A is provided at an upper portion of the attachment body 86. The lower attaching portion 89B is provided at a lower portion of the attachment body 86. One of the headlamp 82 and the sidelamp 83 is attached to the upper attaching portion 89A. The other of the headlamp 82 and the sidelamp 83 is attached to the lower attaching portion 89B. In the present preferred embodiment, the headlamp 82 is attached to the upper attaching portion 89A, and the sidelamp 83 is attached to the lower attaching portion 89B.

The headlamp 82 attached to the upper attaching portion 89A of the attachment body 86 of the attachment bracket 85L can illuminate leftwardly forward of the vehicle body 5. The headlamp 82 attached to the upper attaching portion 89A of the attachment body 86 of the attachment bracket 85R can illuminate rightwardly forward of the vehicle body 5. The sidelamp 83 attached to the lower attaching portion 89B of the attachment body 86 of the attachment bracket 85L can illuminate leftward of the vehicle body 5. The sidelamp 83 attached to the lower attaching portion 89B of the attachment body 86 of the attachment bracket 85R can illuminate rightward of the vehicle body 5. In this manner, the sidelamps 83 can illuminate the vicinity of the left and right entrance steps 17.

Figure 19:
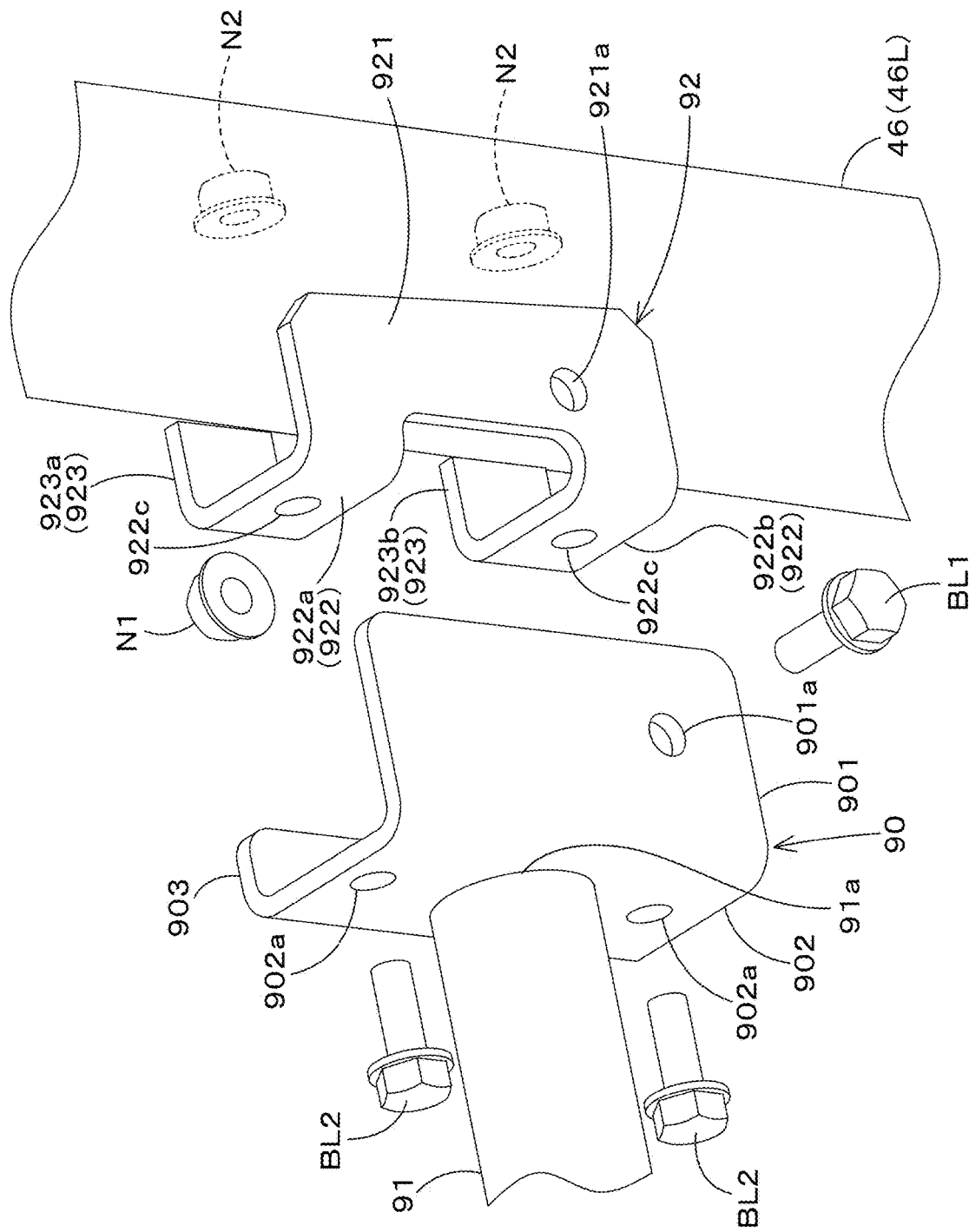
FIG. 19 is a perspective view showing an attachment configuration in which the attachment bracket is attached to a front pillar.

As shown in FIGS. 15 and 19, each of the attachment brackets 85 includes a bracket base 90 and a bracket arm 91. The bracket base 90 is attached to each front pillar 46. The bracket base 90 of the attachment bracket 85L is attached to the first front pillar 46L. The bracket base 90 of the attachment bracket 85R is attached to the second front pillar 46R.

As shown in FIG. 19, the bracket bases 90 are attached to the front pillars 46 via respective catching members 92. The catching members 92 are fixed to the front pillars 46 by welding or other fixing structures or methods. Each of the catching members 92 includes a first plate portion 921, a second plate portion 922, and a third plate portion 923. The first plate portion 921 is fixed to the vehicle-width directional outer side of the corresponding front pillar 46. The second plate portion 922 includes a second plate portion 922a and a second plate portion 922b that are spaced from each other in the vertical direction. The second plate portion 922a extends inward in the vehicle-width direction from an upper portion of the first plate portion 921. The second plate portion 922b extends inward in the vehicle-width direction from a lower portion of the first plate portion 921. The third plate portion 923 includes a third plate portion 923a and a third plate portion 923b that are spaced from each other in the vertical direction. The third plate portion 923a extends rearward from a vehicle-width directional inner end portion of the second plate portion 922a. The third plate portion 923b extends rearward from a vehicle-width directional inner end portion of the second plate portion 922b. The first plate portion 921 and the third plate portions 923 abut at rear ends thereof against each of the front pillars 46. A space is provided between the second plate portions 922 and the corresponding front pillar 46. In this space, a later-discussed nut N2 is arranged.

As shown in FIG. 19, each of the bracket bases 90 includes a first base plate 901, a second base plate 902, and a third base plate 903. The first base plate 901 has one surface facing outward in the vehicle-width direction and the other surface facing inward in the vehicle-width direction. The first base plate 901 is disposed on the vehicle-width directional outer side of the first plate portion 921 and is attached to the first plate portion 921. Specifically, a bolt BL1 is inserted through an attachment hole 901a formed in the first base plate 901 and an attachment hole 921a formed in the first plate portion 921, and the nut N1 is screwed onto the bolt BL1, thus fastening the first base plate 901 to the first plate portion 921. The second base plate 902 extends inward in the vehicle-width direction from a front end of the first base plate 901. The second base plate 902 has one surface facing the front and the other surface facing the rear. The second base plate 902 is disposed in front of the second plate portion 922 and is attached to the second plate portion 922. Specifically, a bolt BL2 is inserted through an attachment hole 902a formed in the second base plate 902 and an attachment hole 922c formed in the second plate portion 922, and a nut N2 is screwed onto the bolt BL2, thus fastening the second base plate 902 to the second plate portion 922. The bracket arm 91 is fixed to one surface (that is, a front surface) of the second base plate 902. The third base plate 903 extends rearward from a vehicle-width directional inside edge portion of the second base plate 902. The third base plate 903 has one surface facing outward in the vehicle-width direction and the other surface facing inward in the vehicle-width direction. The third base plate 903 is disposed behind the third plate portion 923 and is in contact with the third plate portion 923.

As shown in FIGS. 2 and 5, each of the bracket arms 91 extend forward from each of the left and right front portions of the cabin 9, and bends to extend outward in the vehicle-width direction. As shown in FIG. 15, each of the bracket arms 91 extends forward from the corresponding bracket base 90 and support the corresponding attachment body 86.

A first end portion 91a of the bracket arm 91 is fixed to the bracket base 90, and a second end portion 91b of the bracket arm 91 is fixed to the attachment body 86.

Figure 18:
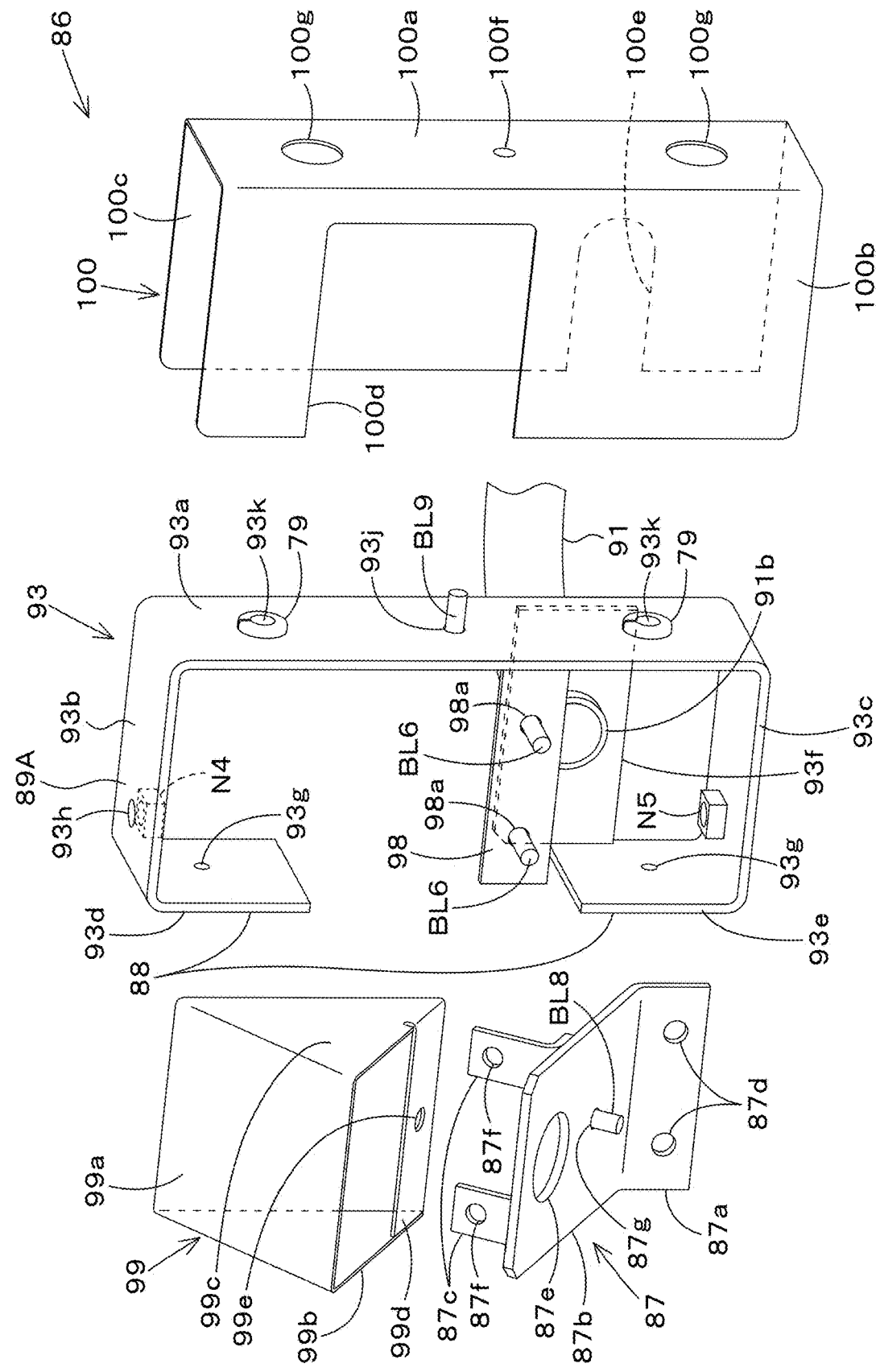
FIG. 18 is an exploded perspective view of an attachment bracket.

The attachment body 86 includes a bracket assembly 93 fixed to the bracket arm 91. As shown in FIG. 18, the bracket assembly 93 includes a rear wall portion 93a, an top wall portion 93b, a bottom wall portion 93c, an upper front wall portion 93d, and a lower front wall portion 93e. The rear wall portion 93a, the top wall portion 93b, the bottom wall portion 93c, the upper front wall portion 93d, and the lower front wall portion 93e are integrally formed by bending a plate material.

The rear wall portion 93a is located at a rear portion of the bracket assembly 93. The rear wall portion 93a extends in a vertical direction with one surface facing forward and the other surface facing rearward. The top wall portion 93b extends forward from an upper portion of the rear wall portion 93a. The bottom wall portion 93c extends forward from a bottom portion of the rear wall portion 93a. The top wall portion 93b is arranged in parallel with the bottom wall portion 93c. The upper front wall portion 93d extends downward from a front portion of the top wall portion 93b. The lower front wall portion 93e extends upward from a front portion of the bottom wall portion 93c. The upper front wall 93d and the lower front wall 93e are arranged in parallel with the rear wall portion 93a. A lower end of the upper front wall portion 93d and an upper end of the lower front wall portion 93e are separated from each other.

Figure 17:
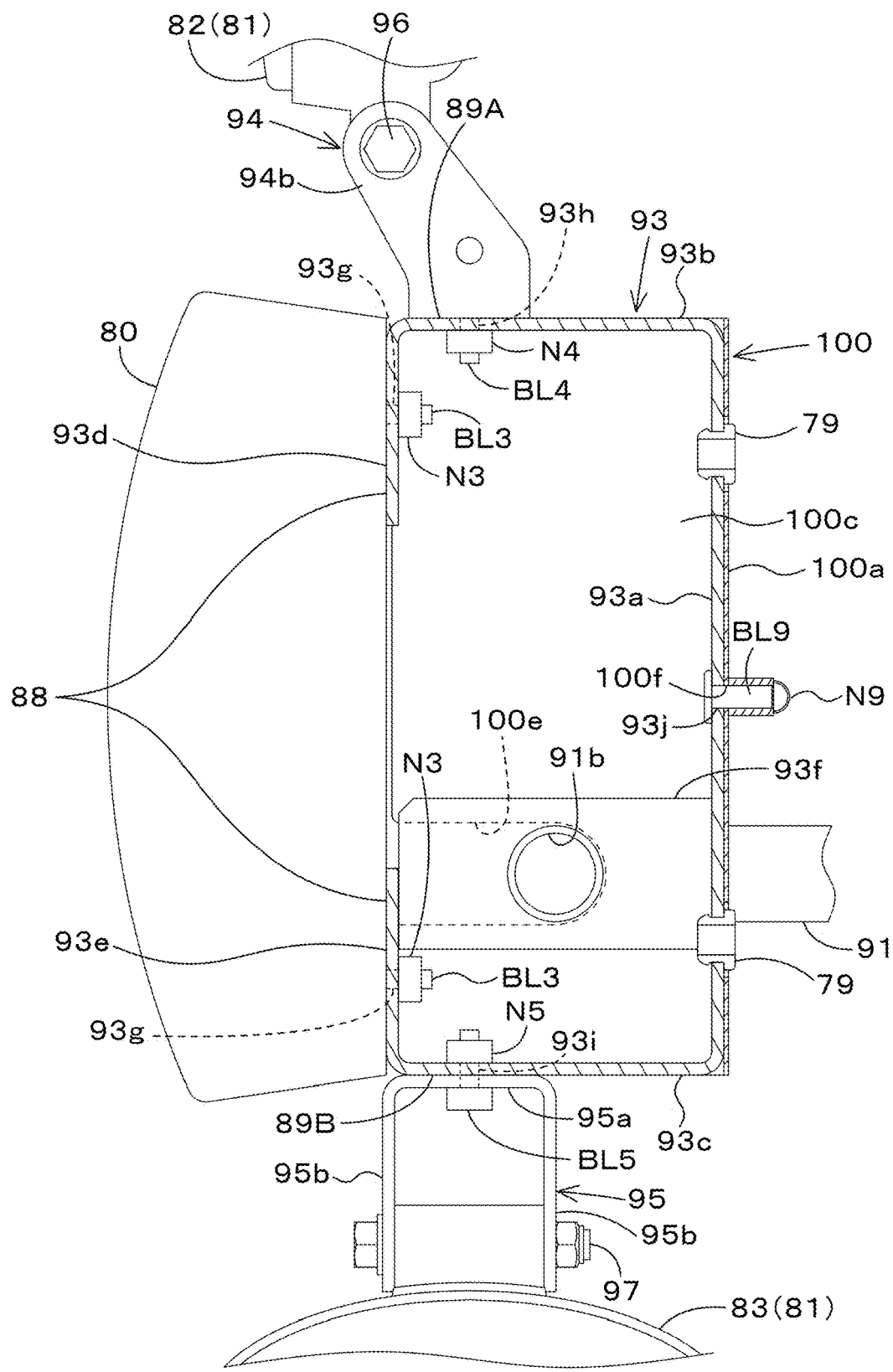
FIG. 17 is a side cross section view showing the attachment configuration of the obstacle detector, the combination lamp, and the work lamp.

As shown in FIGS. 17 and 18, the bracket assembly 93 further includes a connection wall portion 93f. The connection wall portion 93f connects the rear wall portion 93a to the lower front wall portion 93e. The second end portion 91b of the bracket arm 91 is fixed to the connection wall portion 93f. The bracket arm 91 is arranged inward in the vehicle-width direction of the bracket assembly 93, extends outward in the vehicle-width direction from the second end portion 91b fixed to the connection wall portion 93f, and bends to extend rearward.

As shown in FIGS. 15, 17, and 18, the first lamp-attaching portions 88 are defined by the upper front wall portion 93d and the lower front wall portion 93e. An upper portion of the combination lamp 80 is attached to the first lamp-attaching portion 88 defined by the upper front wall portion 93d. A lower portion of the combination lamp 80 is attached to the first lamp-attaching portion 88 defined by the lower front wall portion 93e. The first lamp-attaching portions 88 include front surfaces of the upper front wall portion 93d and the lower front wall portion 93e. A first attachment hole 93g is formed in each of the upper front wall portion 93d and the lower front wall portion 93e. As shown in FIG. 17, the combination lamp 80 is attached to the front surfaces of the upper front wall portion 93d and the lower front wall portion 93e by bolts BL3 inserted into the first attachment holes 93g and nuts N3 screwed onto the bolts BL3.

Figure 16:
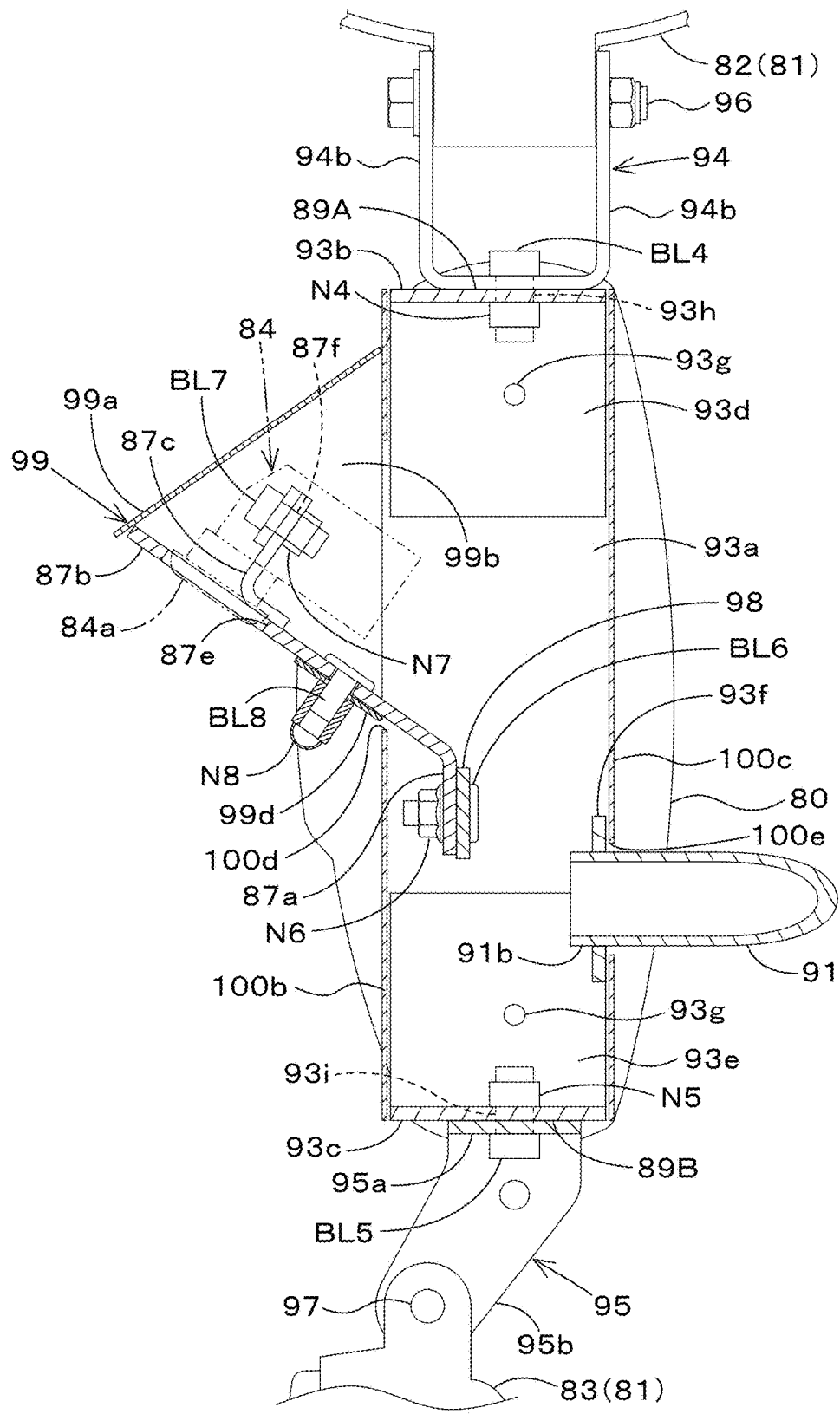
FIG. 16 is a back cross section view showing the attachment configuration of the obstacle detector, the combination lamp, and the work lamp.

As shown in FIGS. 15 to 18, the upper attaching portion 89A is defined by the top wall portion 93b. As shown in FIGS. 15 to 17, the headlamp 82 is attached to the upper attaching portion 89A defined by the top wall portion 93b via an upper bracket 94. The upper attaching portion 89A includes an upper surface of the top wall portion 93b and a second attachment hole 93h formed in the top wall portion 93b. As shown in FIGS. 16 and 17, a bolt BL4 is inserted into the second attachment hole 93h and a nut N4 is screwed onto the bolt BL4, thereby fastening the upper bracket 94 to the upper surface of the top wall portion 93b.

FIG. 16 is a cross-sectional front view of a portion between the rear wall portion 93a and the upper and lower front wall portions 93d and 93e, the cross-section being defined by cutting the portion with a plane parallel to the rear wall portion 93a. While a later-discussed cover member 100 includes first and second side walls 100b and 100c, FIG. 17 is a cross-section side view of a portion of the cover member 100 on the second side wall 100c side, the cross-section being defined by cutting the portion with a plane parallel to the first side wall 100b.

As shown in FIGS. 15 to 17, the upper bracket 94 includes a base portion 94a and journaling portions 94b. The base portion 94a is attached to an upper surface of the top wall portion 93b by the bolt BL4 and nut N4. The journaling portions 94b extend upward from the left and right portions of the base portion 94a, respectively. A first pivot shaft (that is, a bolt) 96 is attached to the journaling portions 94b so as to support a lower portion of the headlamp 82. The first pivot shaft 96 extends in the vehicle-width direction and rotatably supports the lower portion of the headlamp 82. In this manner, the headlamp 82 is rotatable around the first pivot shaft 96. By rotating the headlamp 82 around the first pivot shaft 96, an illumination direction of the headlamp 82 can be changed (adjusted).

As shown in FIGS. 15 to 18, the lower attaching portion 89B is defined by the bottom wall portion 93c. As shown in FIGS. to 17, the sidelamp 83 is attached to the lower attaching portion 89B defined by the bottom wall portion 93c via a lower bracket 95. The lower attaching portion 89B includes a lower surface of the bottom wall portion 93c and a third attachment hole 93i formed in the bottom wall portion 93c. As shown in FIGS. 16 and 17, a bolt BL5 is inserted into the third attachment hole 93i and a nut N5 is screwed onto the bolt BL5, thus fastening the lower bracket 95 to the lower surface of the bottom wall portion 93c.

As shown in FIGS. 15 to 17, the lower bracket 95 includes a base portion 95a and journaling portions 95b. The base portion 95a is attached to a lower surface of the bottom wall portion 93c by the bolt BL5 and nut N5. The journaling portions 95b extend downward from front and rear portions of the base portion 95a, respectively. A second pivot shaft (that is, a bolt) 97 is attached to the journaling portions 95b so as to support an upper portion of the sidelamps 83. The second pivot shaft 97 extends in the fore-and-aft direction and rotatably supports the upper portion of the sidelamp 83. In this manner, the sidelamp 83 is rotatable around the second pivot shaft 97. By rotating the sidelamp 83 around the second pivot shaft 97, an illumination direction of the sidelamp 83 can be changed (adjusted).

As shown in FIGS. 16 and 18, the bracket assembly 93 includes an attachment plate 98. The attachment plate 98 protrudes forward from a vertically intermediate portion of the rear wall portion. The attachment plate 98 is arranged between the upper front wall portion 93d and the lower front wall portion 93e in the vertical direction and closer to the lower front wall portion 93e. The detector-attaching portion 87 is attached to the attachment plate 98.

As shown in FIGS. 16 and 18, the detector-attaching portion includes an attachment base 87a, a sloped wall 87b, and a detector stay 87c. The attachment base 87a is attached to the attachment plate 98. Specifically, a bolt BL6 is inserted into a fourth attachment hole 87d formed in the attachment base 87a and a fifth attachment hole 98a formed in the attachment plate 98 and a nut N6 is screwed onto the bolt BL6, thus fastening the attachment base 87a to the attachment plate 98. The sloped wall 87b is inclined upwardly outward in the vehicle-width direction from the attachment base 87a. The attachment base 87a and the sloped wall 87b are formed by bending a single plate.

As shown in FIGS. 15, 16, and 18, the sloped wall 87*b* includes a transmitter opening 87*e* in which a transmitter of the obstacle detector 84 is located. The sonic waves are emitted downwardly outward in the vehicle-width direction from the obstacle detector 84 through the transmission hole 87*e*. Therefore, the obstacle detector 84 can detect obstacles sideward and below the vehicle body 5.

The detector stay 87*c* is fixed to an upper surface of the sloped wall 87*b*. A sixth attachment hole 87*f* is formed in the detector stay 87*c* to attach the obstacle detector 84. A bolt BL7 is inserted into the sixth attachment hole 87*f* and a nut N7 is screwed onto the bolt BL7, thus fastening the obstacle detector 84 to the detector stay 87*c*.

As shown in FIGS. 15 and 16, a housing member 99 is attached to the detector-attaching portion 87. The housing member and the sloped wall 87*b* define a space to incorporate the obstacle detector 84. As shown in FIGS. 15, 16, and 18, the housing member 99 includes a first wall 99*a*, a second wall 99*b*, a third wall 99*c*, and an attachment plate 99*d*. The first wall 99*a* is inclined downwardly outward in the vehicle-width direction. The second wall 99*b* extends outward in the vehicle-width direction from a front portion of the first wall 99*a*. The third wall 99*c* extends outward in the vehicle-width direction from a rear portion of the first wall 99*a*. The attachment plate 99*d* extends from a vehicle-width directional inner side of the third wall 99*c* to a vehicle-width directional inner side of the third wall 99*c*. A seventh attachment hole 99*e* is formed in the attachment plate 99*d*. A bolt BL8 is inserted into the seventh attachment hole 99*e* and an eighth attachment hole 87*g* formed in the sloped wall 87*b* and a nut (that is, a cap nut) N8 is screwed onto the bolt BL8, thus fastening the housing member 99 to the sloped wall 87*b* of the detector attachment portion 87.

As shown in FIGS. 15 to 18, the attachment body 86 includes a cover member 100. The cover member 100 includes a back wall 100*a*, a first side wall 100*b*, and a second side wall 100*c*. The back wall 100*a* is attached to a back surface side of the rear wall portion 93*a* of the bracket assembly 93. Specifically, a bolt BL9 is inserted through a ninth attachment hole 100*f* formed in the back wall 100*a* and a tenth attachment hole 93*j* formed in the rear wall portion 93*a* and a nut (that is, a cap nut) N9 is screwed onto the bolt BL9, thus fastening the back wall 100*a* to the rear wheel portion 93*a*.

The rear wall portion 93*a* and the back wall 100*a* have insertion holes 93*k* and 100*g*, respectively, for inserting wires and the like. The insertion hole 93*k* and the insertion hole 100*g* are arranged to match with each other and are joined to each other by a tubular fastener (that is, a grommet tool) 79.

The first side wall 100*b* extends forward from a vehicle-width directional outward end portion of the back wall 100*a*. The second side wall 100*c* extends forward from a vehicle-width directional inward end portion of the back wall 100*a*. The first side wall 100*b* has a first notch 100*d*. The first notch 100*d* is open forward so as to allow the detector-attaching portion 87 with the obstacle detector 84 to be inserted therethrough from the front. The sloped wall 87*b* of the detector-attaching portion 87 and the housing member 99 protrude outward in the vehicle-width direction from the first notch 100*d*. Portions of the sloped wall 87*b* and the housing member 99 protruding from the first notch 100*d* are formed in a triangular prism shape. The second side wall 100*c* has a second notch 100*e*. The second notch 100*e* is open forward so as to allow the bracket arm 91 to be inserted thereinto from the front. The bracket arm 91 extends through the second notch 100*e*.

Figure 20:
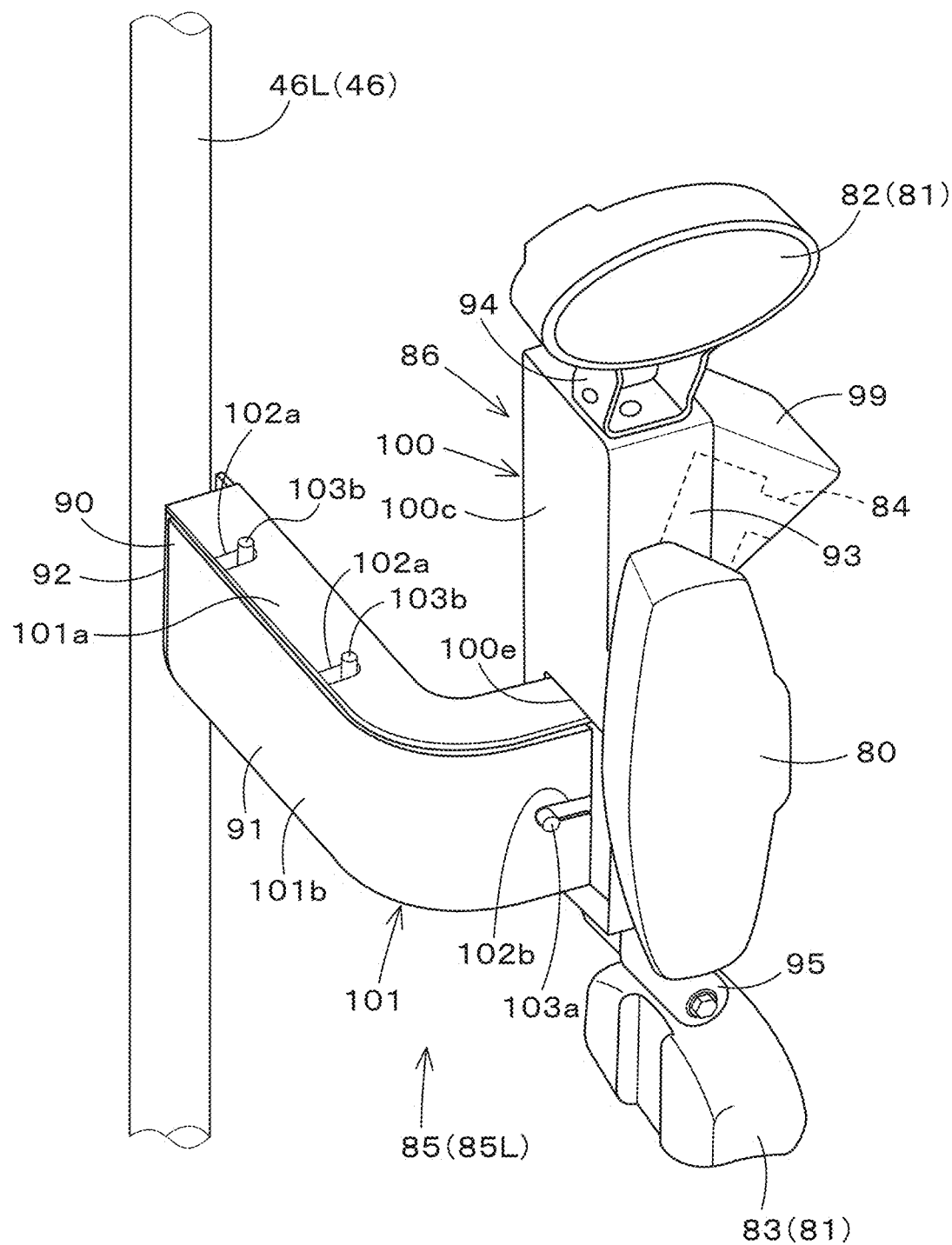
FIG. 20 is a perspective view showing another preferred embodiment of the attachment configuration of the obstacle detector, the combination lamp, and the work lamp.

FIG. 20 is a perspective view of an attachment structure of the obstacle detectors 84, the combination lamp 80, and the work lamps 81 according to another preferred embodiment (referred to as a second preferred embodiment). The points where the attachment structure according to the second preferred embodiment differs from the attachment structure according to the above-described preferred embodiment (that is, the first preferred embodiment) will be described below.

The attachment structure according to the second preferred embodiment differs from the configuration of the attachment bracket 85 according to the first preferred embodiment. Specifically, in comparison with the first preferred embodiment in which the attachment bracket 85 includes the pipe-shaped bracket arm 91 connected to the bracket base 90, the attachment bracket 85 according to the second preferred embodiment includes a cylindrical body 101 serving as a single component equivalent to the combination of the bracket base 90 and bracket arm 91. In other words, the attachment bracket 85 according to the second preferred embodiment includes the cylindrical body 101 serving as the bracket base 90 and the bracket arm 91.

The cylindrical body 101 has a square cylindrical shape. The cylindrical body 101 is bent into an L-shape in plan view. The cylindrical body 101 has an internal space with a cross-sectional area that allows insertion of a harness (that is, wiring) connected to the obstacle detectors 84, combination lamp 80, and work lamps 81.

A first end (defining and functioning as the bracket base 90) of the cylindrical body 101 is attached to a catching member 92 fixed to the front pillar 46. A second end of the cylindrical body 101 (defining and functioning as the bracket arm 91) is fixed to the bracket assembly 93. The catching member 92 and the front pillar 46 are formed with holes through which harnesses (that is, wires) are inserted and connected to the obstacle detectors 84, the combination lamp 80, and the work lamps 81, thus allowing the harnesses to be arranged through the interior of the front pillar 46.

The second end of the cylindrical body 101 is connected to the connection wall portion 93*f* (see FIG. 18) of the bracket assembly 93 through the second notch 100*e* formed in the second side wall 100*c* of the cover member 100. Since a cross-sectional area of the cylindrical body 101 is larger than that of the bracket arm 91, the second notch 100*e* has a width larger than that in the first preferred embodiment.

The cylindrical body 101 includes a first member 101*a* and a second member 101*b*. The first member 101*a* is attached to the catching member 92 by a fastener such as bolts or welding.

The second member 101*b* is detachably attached to the first member 101*a*. The first member 101*a* includes at least one notch 102*a* and at least one protrusion 103*a*. The second member 101*b* includes at least one notch 102*b* and at least one protrusion 103*b*.

The notch 102*a* is formed by notching an upper plate defining an upper surface of the first member 101*a* (that is, an upper surface of the cylindrical body 101). The notch 102*b* is formed by notching a side plate defining a side surface of the second member 101*b* (that is, a side surface of the cylindrical body 101). The notch 102*a* extends outward in the vehicle-width direction from its vehicle-width directional inner side end. The notch 102*b* extends inward in the vehicle-width direction from its vehicle-width directional outer side end.

The rod-shaped protrusion 103*a* protrudes forward from a side surface of the first member 101*a*. The protrusion 103*a* can be inserted into the notch 102*b*. The rod-shaped protrusion 103b protrudes upward from an upper surface of the second member 101b. The protrusion 103b can be inserted into the notch 102a. The protrusion 103a is inserted into the notch 102b and the protrusion 103b is inserted into the notch 102a, thus engaging the second member 101b to the first member 101a. In addition, by removing the second member 101b from the first member 101a, the interior space of the cylindrical body 101 is opened.

The effectiveness of the working vehicle (that is, the tractor) 1 according to the above-described preferred embodiments will be described below.

The working vehicle (that is, the tractor) 1 includes the vehicle body 5, the cabin 9 mounted on the vehicle body 5, the obstacle detector 84 to detect an obstacle in the vicinity of the vehicle body 5, the detection information processor 40 to perform processing related to the detection information from the obstacle detector 84, a monitoring controller 42 configured or programmed to control movement of the vehicle body 5 based on the processing by the detection information processor 40, and the support body arranged in the housing space S3 provided in the front portion of the cabin 9 in the roof 16 and supporting the detection information processor 40 and the monitoring controller 42 in the housing space S3.

Accordingly, a device (that is, the detection information processors 40) that performs processing related to the detection information from the obstacle detector 84 and a device (that is, the monitoring controller 42) that controls the movement of the vehicle body 5 based on the processing by the device can be supported on the support body 53 arranged in the housing space S3 in the front portion of the roof 16 of the cabin 9. Therefore, these devices 40 and 42 can be integrated and assembled together with the support body 53 at the front portion in the roof 16 of the cabin 9, thus shortening the time for the assembly work and facilitating the wiring work.

The working vehicle 1 is provided with the camera that shoots surroundings of the vehicle body 5, and the image processor configured or programmed to process the images shot by the camera, and the support body 53 supports the image processor 41 in the housing space S3.

Accordingly, the detection information processor 40, the monitoring controller 42, and the image processor 41 can be integrated and assembled together with the support body 53 to the cabin 9, thus further shortening the time for the assembly work and facilitating the wiring work.

The roof 16 includes the inner roof 16A having the opening 65, the outer roof 16B forming the housing space S3 between the inner roof 16A and the outer roof 16B, and the movable plate 16C shiftable between the first position for closing the opening 65 and the second position for opening the opening 65. The support body 53 supports, above the opening 65, the detection information processor 40, the monitoring controller 42, and the image processor 41 aligned in the width direction of the vehicle body 5.

Accordingly, the space occupied by the detection information processor 40, the image processor 41, and the monitoring controller 42 can be reduced or minimized in the fore-and-aft direction. Therefore, the detection information processor 40, the image processor 41, and the monitoring controller 42 can be integrated and arranged in the front portion of the housing space S3. In addition, by shifting the movable plate 16C to the second position to open the opening 65, the detection information processor 40, the image processor 41, and the monitoring controller 42 can be easily accessed from the inside of the cabin 9 through the opening 45. Accordingly, works such as the maintenance on the detection information processor 40, image processor 41, and monitoring controller 42 can be easily performed.

The support body 53 extends from one side to the other side in the width direction of the vehicle body 5 so as to be bridged over the opening 45.

Accordingly, the support body 53 can be easily and reliably positioned and installed at a position above the opening 45. In addition, access to the detection information processor 40, the image processor 41, and the monitoring controller 42 supported by the support body 53 through the opening 45 is made easier.

The working vehicle is provided with a position detector 30 to receive signals from the positioning satellites and the base stations to detect a position of the vehicle body 5. The position detector 30 is arranged forward of the roof 16 and forward of the detection information processor 40, the image processor 41, and the monitoring controller 42.

Accordingly, the detection information processor 40, the monitoring controller 42, the image processor 41, and the position detector 30 can be placed close to each other in the fore-and-aft direction. Therefore, the detection information processor 40, the monitoring controller 42, the image processor 41, and the position detector 30 can be arranged collectively near the front portion of the roof 16, thus facilitating the wiring and maintenance.

The detection information processors 40 include the plurality of detection information processors 40A, 40B, and 40C, and the plurality of detection information processors 40A, 40B, and 40C are aligned in the width direction of the vehicle body 5 and are offset in the fore-and-aft direction.

Accordingly, the plurality of detection information processors 40A, 40B, and 40C can be arranged close to each other in the width direction of the vehicle body (that is, the vehicle-width direction), thus making it possible to reduce the space occupied by the plurality of detection information processors 40A, 40B, and 40C in the vehicle-width direction. Therefore, the plurality of detection information processors 40A, 40B, and 40C can be juxtaposed with the monitoring controller 42 and the image processor 41 in the vehicle-width direction, and the detection information processors 40A, 40B, and 40C, the monitoring controller 42, and the image processor 41 are arranged collectively at the front portion of the roof 16.

The cabin 9 includes the upper frame 49 supporting the roof 16. The upper frame 49 includes the front upper frame 49A supporting the front portion of the roof 16, the rear upper frame 49B supporting the rear portion of the roof 16, the first side upper frame 49L supporting the one width directional side portion of the roof 16, the second side upper frame 49R supporting the other width directional side portion of the roof 16, the connecting frame 50 connecting the first side upper frame 49L and the second side upper frame 49R, the first reinforcing frame 51L connecting the one width directional side portion of the connecting frame 50 to the front upper frame 49A, and the second reinforcing frame 51R connecting the other width directional side portion of the connecting frame 50 to the front upper frame 49A. The support body 53 is interposed between the first reinforcing frame 51L and the second reinforcing frame 51R.

Accordingly, the support body 53 is supported by the rectangular frame including the front upper frame 49A, the connecting frame 50, the first reinforcing frame 51L, and the second reinforcing frame 51R. In this manner, since the support body 53 is firmly and reliably supported on the upper frame 49, the detection information processor 40, the image processor 41, and the monitoring controller 42 can be stably supported in the housing space S3.

The working vehicle (e.g., the tractor) 1 includes the vehicle body 5, the obstacle detector 84 to detect an obstacle in the vicinity of the vehicle body 5, the at least one lamp 80 or 81 to be lighted on a peripheral portion of the vehicle body 5, and the attachment bracket 85 attached to the vehicle body 5. The attachment bracket 85 includes the attachment body 86 including the detector-attaching portion 87 to which the obstacle detector 84 is attached, and the at least one lamp-attaching portion 88 or 89 to which the at least one combination lamp 80 is attached.

Accordingly, since the detector-attaching portion 87 and the at least one lamp-attaching portion 88 or 89 are provided in the attachment body 86, the obstacle detector 84 and the at least one lamp 81 can be collectively installed to a single member defined as the attachment body 86, thus facilitating the installation of these devices and reducing costs for the installation.

The working vehicle 1 includes the cabin 9 mounted on the vehicle body 5, the entrance step 17 provided under the cabin 9, and the front pillar 46 provided above the entrance step and at the front portion of the cabin 9. The attachment bracket 85 is attached to the front pillar 46.

Accordingly, the obstacle detectors 84 and the at least one lamp 80 or 81 can be attached to the front pillar 46 via the attachment bracket 85. Therefore, the obstacle detector 84 and the at least one lamp 80 or 81 can be arranged above the entrance step 17, thereby ensuring safety for a person boarding on and alighting from the cabin 9.

The obstacle detector 84 is configured to detect an obstacle outward in the vehicle-width direction from the vehicle body 5 and between the front wheel 2 and the rear wheel 3.

Accordingly, the vehicle body 5 can be prevented from approaching and contacting obstacles that exist outward in the width direction from the vehicle body 5 and between the front wheels 2 and the rear wheels 3. The entrance step 17 disposed between the front wheel 2 and the rear wheel 3 can be prevented from approaching and contacting obstacles, thus ensuring safety for a person boarding on and alighting from the cabin 9.

The at least one lamp includes the combination lamp 80 including a plurality of lamps combined with each other, and the work lamp 81 to illuminate the vicinity of the vehicle body 5. The at least one lamp-attaching portion includes the first lamp-attaching portion 88 to which the combination lamp 80 is attached, and the second lamp-attaching portion 89 to which the work lamp 81 is attached.

Accordingly, the obstacle detector 84, the combination lamp 80, and the work lamp 81 can be collectively attached to a single structure defined as the attachment body 86, thus facilitating the installation of these devices and reducing costs for the installation.

The detector-attaching portion 87 is provided at the vehicle-width directional outward portion of the attachment body so as to enable the obstacle detector 84 attached to the detector-attaching portion 87 to detect an obstacle outward in the vehicle-width direction from the vehicle body 5, the first lamp-attaching portion 88 is provided at the front portion of the attachment body 86, the work lamp 81 includes the headlamp 82 to illuminate forward from the vehicle body 5, and the sidelamp 83 to illuminate outward in the vehicle-width direction from the vehicle body 5, and the second lamp-attaching portion 89 includes the upper attaching portion 89A, to which one of the headlamp 82 and the sidelamp 83 is attached, provided at the upper portion of the attachment body 86, and the lower attaching portion 89B, to which the other of the headlamp 82 and the sidelamp 83 is attached, provided at the lower portion of the attachment body 86.

Accordingly, the obstacle detector 84 can be attached to the vehicle-width directional outer side of the attachment body 86, and the headlamp 82 and the sidelamp 83 can be attached to the upper and lower portions of the attachment body 86 separately from each other. In this manner, the obstacle detector 84, the headlamp and the sidelamp 83 can be collectively attached to the attachment body 86 in appropriate directions.

The attachment bracket 85 includes the bracket base 90 attached to the front pillar 46, and the bracket arm 91 extending forward from the bracket base 90 and supporting the attachment body 86. The attachment body 86 includes the bracket assembly 93 fixed to the bracket arm 91. The bracket assembly 93 includes the rear wall portion 93a, the top wall portion 93b extending forward from the upper end of the rear wall portion 93a, the bottom wall portion 93c extending forward from the lower end of the rear wall portion 93a, the upper front wall portion 93d extending downward from the front end of the top wall portion 93b, and the lower front wall portion 93e extending upward from the front end of the bottom wall portion 93c. The first lamp-attaching portion 88 is defined by the upper front wall portion 93d and the lower front wall portion 93e. The upper attaching portion 89A is defined by the top wall portion 93b. The lower attaching portion 89B is defined by the bottom wall portion 93c.

Accordingly, the attachment bracket 85 can be securely attached to the front pillar 46. In addition, the first lamp-attaching portion 88, the upper attaching portion 89A, and the lower attaching portion 89B can be arranged in close proximity to each other, thus reducing or minimizing the size of the attachment bracket 85.

The obstacle detector 84 includes the sonar including the transmitter 84a. The sonar is configured to detect an obstacle by a sonic wave transmitted from the transmitter 84a. The bracket assembly 93 includes the attachment plate 98 protruding forward from a vertically intermediate portion of the rear wall portion 93a. The detector-attaching portion 87 includes the attachment base 87a attached to the attachment plate 98, the sloped wall 87b extending upwardly outward in the vehicle-width direction from the attachment base 87a, and the detector stay 87c, to which the obstacle detector 84 is attached, fixed on the upper surface of the sloped wall 87b. The sloped wall 87b includes the transmitter opening 87e in which the transmitter 84a is provided.

Accordingly, the obstacle detectors 84 including a sonar that detects obstacles by sonic waves can be attached so that the transmitter 84a faces diagonally downward and outward in the vehicle-width direction and is exposed through the transmitter opening 87e. Thus, the obstacle detector 84 including the sonar can reliably detect an obstacle existing downward and outward in vehicle-width direction.

The bracket assembly 93 includes the connection wall portion 93f connecting the rear wall portion 93a to the lower front wall portion 93e. The bracket arm 91 is provided inward in the vehicle-width direction from the bracket assembly 93 and is fixed to the connection wall portion 93f. The attachment body 86 includes the cover member 100 including the back wall 100a attached to the back surface of the rear wall portion 93a, the first side wall 100b extending forward from the vehicle-width directional outer end of the back wall 100a, and the second side wall 100b extending forward from the vehicle-width directional inner end of the back wall 100a. The first side wall 100b includes the first notch 100d being open forward so that the detector-attaching portion 87 having the obstacle detector 84 attached thereto can be inserted rearward into the first notch 100d. The second side wall 100b includes the second notch 100e being open forward so that the bracket arm 91 can be inserted rearward into the second notch 100e.

Accordingly, the bracket assembly 93 with the bracket arm 91 and the obstacle detector 84 attached thereto can be inserted from the front and assembled to the cover member 100, so that the assembly work can be performed efficiently. In addition, the rigidity of the attachment bracket 85 can be increased by reinforcing the bracket assembly 93 with the cover member 100 without interfering with the arrangement of the detector-attaching portion 87 and the bracket arm 91.

The plurality of lamps included in the combination lamp 80 include the position lamp to inform people around the working vehicle of a vehicle width, and the turn-signal lamp to indicate a turn-direction of the vehicle body when turning.

Accordingly, the position lamp and the turn-signal lamp, together with the obstacle detector 84 and the work lamp 82, can be collectively installed to a single member defined as the attachment body 86, thereby facilitating the installation of these devices and reducing costs for the installation.

In the above description, the preferred embodiments of the present invention have been explained. However, all the features of the preferred embodiments disclosed in this application should be considered just as examples, and the preferred embodiments do not restrict the present invention accordingly. A scope of the present invention is shown not in the above-described preferred embodiments but in the claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a vehicle body;
    an obstacle detector to detect an obstacle in a vicinity of the vehicle body;
    at least one lamp to be lighted on a peripheral portion of the vehicle body; and
    an attachment bracket attached to the vehicle body; wherein
    the attachment bracket includes an attachment body including:
        a detector-attaching portion to which the obstacle detector is attached; and
        at least one lamp-attaching portion to which the at least one lamp is attached.

2. The working vehicle according to claim 1, further comprising:
    a cabin mounted on the vehicle body;
    an entrance step under the cabin; and
    a front pillar above the entrance step and at a front portion of the cabin; wherein
    the attachment bracket is attached to the front pillar.

3. The working vehicle according to claim 1, further comprising:
    a front wheel on a front portion of the vehicle body; and
    a rear wheel on a rear portion of the vehicle body, wherein
    the obstacle detector is configured to detect an obstacle outward in a vehicle-width direction from the vehicle body and between the front wheel and the rear wheel.

4. The working vehicle according to claim 2, further comprising:
    a front wheel on a front portion of the vehicle body; and
    a rear wheel on a rear portion of the vehicle body; wherein
    the obstacle detector is configured to detect an obstacle outward in a vehicle-width direction from the vehicle body and between the front wheel and the rear wheel.

5. The working vehicle according to claim 1, wherein the at least one lamp includes:
    a combination lamp including a plurality of lamps combined with each other; and
    a work lamp to illuminate the vicinity of the vehicle body; and
    the at least one lamp-attaching portion includes:
    a first lamp-attaching portion to which the combination lamp is attached; and
    a second lamp-attaching portion to which the work lamp is attached.

6. The working vehicle according to claim 2, wherein the at least one lamp includes:
    a combination lamp including a plurality of lamps combined with each other; and
    a work lamp to illuminate the vicinity of the vehicle body; and
    the at least one lamp-attaching portion includes:
    a first lamp-attaching portion to which the combination lamp is attached; and
    a second lamp-attaching portion to which the work lamp is attached.

7. The working vehicle according to claim 3, wherein the at least one lamp includes:
    a combination lamp including a plurality of lamps combined with each other; and
    a work lamp to illuminate the vicinity of the vehicle body; and
    the at least one lamp-attaching portion includes:
    a first lamp-attaching portion to which the combination lamp is attached; and
    a second lamp-attaching portion to which the work lamp is attached.

8. The working vehicle according to claim 4, wherein the at least one lamp includes:
    a combination lamp including a plurality of lamps combined with each other; and
    a work lamp to illuminate the vicinity of the vehicle body; and
    the at least one lamp-attaching portion includes:
    a first lamp-attaching portion to which the combination lamp is attached; and
    a second lamp-attaching portion to which the work lamp is attached.

9. The working vehicle according to claim 5, wherein
    the detector-attaching portion is provided at a vehicle-width directional outward portion of the attachment body to enable the obstacle detector attached to the detector-attaching portion to detect an obstacle outward in the vehicle-width direction from the vehicle body;
    the first lamp-attaching portion is provided at a front portion of the attachment body;
    the work lamp includes:
        a headlamp to illuminate forward from the vehicle body; and
        a sidelamp to illuminate outward in the vehicle-width direction from the vehicle body; and the second lamp-attaching portion includes:
   an upper attaching portion, to which one of the headlamp and the sidelamp is attached, at an upper portion of the attachment body; and
   a lower attaching portion, to which the other of the headlamp and the sidelamp is attached, at a lower portion of the attachment body.

10. The working vehicle according to claim 6, wherein the detector-attaching portion is provided at a vehicle-width directional outward portion of the attachment body to enable the obstacle detector attached to the detector-attaching portion to detect an obstacle outward in the vehicle-width direction from the vehicle body;
the first lamp-attaching portion is provided at a front portion of the attachment body;
the work lamp includes:
   a headlamp to illuminate forward from the vehicle body; and
   a sidelamp to illuminate outward in the vehicle-width direction from the vehicle body; and
the second lamp-attaching portion includes:
   an upper attaching portion, to which one of the headlamp and the sidelamp is attached, at an upper portion of the attachment body; and
   a lower attaching portion, to which the other of the headlamp and the sidelamp is attached, at a lower portion of the attachment body.

11. The working vehicle according to claim 7, wherein the detector-attaching portion is provided at a vehicle-width directional outward portion of the attachment body to enable the obstacle detector attached to the detector-attaching portion to detect an obstacle outward in the vehicle-width direction from the vehicle body;
the first lamp-attaching portion is provided at a front portion of the attachment body;
the work lamp includes:
   a headlamp to illuminate forward from the vehicle body; and
   a sidelamp to illuminate outward in the vehicle-width direction from the vehicle body; and
the second lamp-attaching portion includes:
   an upper attaching portion, to which one of the headlamp and the sidelamp is attached, at an upper portion of the attachment body; and
   a lower attaching portion, to which the other of the headlamp and the sidelamp is attached, at a lower portion of the attachment body.

12. The working vehicle according to claim 8, wherein the detector-attaching portion is provided at a vehicle-width directional outward portion of the attachment body to enable the obstacle detector attached to the detector-attaching portion to detect an obstacle outward in the vehicle-width direction from the vehicle body;
the first lamp-attaching portion is provided at a front portion of the attachment body;
the work lamp includes:
   a headlamp to illuminate forward from the vehicle body; and
   a sidelamp to illuminate outward in the vehicle-width direction from the vehicle body; and
the second lamp-attaching portion includes:
   an upper attaching portion, to which one of the headlamp and the sidelamp is attached, at an upper portion of the attachment body; and
   a lower attaching portion, to which the other of the headlamp and the sidelamp is attached, at a lower portion of the attachment body.

13. The working vehicle according to claim 2, wherein the attachment bracket includes:
   a bracket base attached to the front pillar; and
   a bracket arm extending forward from the bracket base and supporting the attachment body;
the attachment body includes:
   a bracket assembly fixed to the bracket arm,
the bracket assembly including:
   a rear wall portion;
   a top wall portion extending forward from an upper end of the rear wall portion;
   a bottom wall portion extending forward from a lower end of the rear wall portion;
   an upper front wall portion extending downward from a front end of the top wall portion; and
   a lower front wall portion extending upward from a front end of the bottom wall portion;
the first lamp-attaching portion includes the upper front wall portion and the lower front wall portion;
the upper attaching portion includes the top wall portion; and
the lower attaching portion includes the bottom wall portion.

14. The working vehicle according to claim 3, wherein the attachment bracket includes:
   a bracket base attached to the front pillar; and
   a bracket arm extending forward from the bracket base and supporting the attachment body;
the attachment body includes:
   a bracket assembly fixed to the bracket arm,
the bracket assembly including:
   a rear wall portion;
   a top wall portion extending forward from an upper end of the rear wall portion;
   a bottom wall portion extending forward from a lower end of the rear wall portion;
   an upper front wall portion extending downward from a front end of the top wall portion; and
   a lower front wall portion extending upward from a front end of the bottom wall portion;
the first lamp-attaching portion includes the upper front wall portion and the lower front wall portion;
the upper attaching portion includes the top wall portion; and
the lower attaching portion includes the bottom wall portion.

15. The working vehicle according to claim 4, wherein the attachment bracket includes:
   a bracket base attached to the front pillar; and
   a bracket arm extending forward from the bracket base and supporting the attachment body;
the attachment body includes:
   a bracket assembly fixed to the bracket arm,
the bracket assembly including:
   a rear wall portion;
   a top wall portion extending forward from an upper end of the rear wall portion;
   a bottom wall portion extending forward from a lower end of the rear wall portion;
   an upper front wall portion extending downward from a front end of the top wall portion; and
   a lower front wall portion extending upward from a front end of the bottom wall portion;
the first lamp-attaching portion includes the upper front wall portion and the lower front wall portion;
the upper attaching portion includes the top wall portion; and the lower attaching portion includes the bottom wall portion.

16. The working vehicle according to claim 13, wherein the obstacle detector includes a sonar including a transmitter;
the sonar is configured to detect an obstacle by a sonic wave transmitted from the transmitter;
the bracket assembly includes:
an attachment plate protruding forward from a vertically intermediate portion of the rear wall portion;
the detector-attaching portion includes:
an attachment base attached to the attachment plate;
a sloped wall extending upwardly outward in the vehicle-width direction from the attachment base; and
a detector stay, to which the obstacle detector is attached, fixed on an upper surface of the sloped wall; and
the sloped wall includes:
a transmitter opening in which the transmitter is provided.

17. The working vehicle according to claim 14, wherein the obstacle detector includes a sonar including a transmitter;
the sonar is configured to detect an obstacle by a sonic wave transmitted from the transmitter;
the bracket assembly includes:
an attachment plate protruding forward from a vertically intermediate portion of the rear wall portion;
the detector-attaching portion includes:
an attachment base attached to the attachment plate;
a sloped wall extending upwardly outward in the vehicle-width direction from the attachment base; and
a detector stay, to which the obstacle detector is attached, fixed on an upper surface of the sloped wall; and
the sloped wall includes:
a transmitter opening in which the transmitter is provided.

18. The working vehicle according to claim 15, wherein the obstacle detector includes a sonar including a transmitter;
the sonar is configured to detect an obstacle by a sonic wave transmitted from the transmitter;
the bracket assembly includes:
an attachment plate protruding forward from a vertically intermediate portion of the rear wall portion;
the detector-attaching portion includes:
an attachment base attached to the attachment plate;
a sloped wall extending upwardly outward in the vehicle-width direction from the attachment base; and
a detector stay, to which the obstacle detector is attached, fixed on an upper surface of the sloped wall; and
the sloped wall includes:
a transmitter opening in which the transmitter is provided.

19. The working vehicle according to claim 13, wherein the bracket assembly includes:
a connection wall portion connecting the rear wall portion to the lower front wall portion;
the bracket arm is provided inward in the vehicle-width direction from the bracket assembly and is fixed to the connection wall portion;
the attachment body includes:
a cover including:
a back wall attached to a back surface of the rear wall portion;
a first side wall extending forward from a vehicle-width directional outer end of the back wall; and
a second side wall extending forward from a vehicle-width directional inner end of the back wall;
the first side wall includes:
a first notch being open forward so that the detector-attaching portion having the obstacle detector attached thereto can be inserted rearward into the first notch; and
the second side wall includes:
a second notch being open forward so that the bracket arm can be inserted rearward into the second notch.

20. The working vehicle according to claim 5, wherein the plurality of lamps included in the combination lamp include:
a position lamp to inform people around the working vehicle of a vehicle width; and
a turn-signal lamp to indicate a turn-direction of the vehicle body when turning.

* * * * *